United States Patent
Sanders et al.

(10) Patent No.: US 9,710,462 B2
(45) Date of Patent: Jul. 18, 2017

(54) SYSTEM AND METHOD FOR AUTOMATICALLY TRANSLATING AN IMAGED SURFACE OF AN OBJECT

(71) Applicants: Donald H. Sanders, Williamstown, MA (US); Eben Gay, Southborough, MA (US)

(72) Inventors: Donald H. Sanders, Williamstown, MA (US); Eben Gay, Southborough, MA (US)

(73) Assignee: Learning Sites, Inc., Williamstown, MA (US)

( * ) Notice: Subject to any disclaimer, the term of this patent is extended or adjusted under 35 U.S.C. 154(b) by 491 days.

(21) Appl. No.: 14/167,988

(22) Filed: Jan. 29, 2014

(65) Prior Publication Data
US 2014/0214398 A1 Jul. 31, 2014

Related U.S. Application Data

(60) Provisional application No. 61/758,218, filed on Jan. 29, 2013.

(51) Int. Cl.
*G06F 17/28* (2006.01)
*G06T 19/00* (2011.01)

(52) U.S. Cl.
CPC .......... *G06F 17/2863* (2013.01); *G06T 19/00* (2013.01); *G06T 2219/021* (2013.01)

(58) Field of Classification Search
None
See application file for complete search history.

(56) References Cited

U.S. PATENT DOCUMENTS

| 7,885,807 B2* | 2/2011 | Bagnato | G06F 17/289 704/2 |
| 2008/0097741 A1 | 4/2008 | Bagnato et al. | |
| 2008/0232679 A1* | 9/2008 | Hahn | G06K 9/2036 382/154 |

OTHER PUBLICATIONS

Meyer, Élise, et al. "Photogrammetry for the epigraphic survey in the great hypostyle hall of Karnak temple: a new approach." Proceedings of the XXth Congress of the ISPRS, Istanbul, Turkey. 2004.*

(Continued)

*Primary Examiner* — Chan Park
*Assistant Examiner* — Geoffrey E Summers
(74) *Attorney, Agent, or Firm* — Guntin & Gust, PLC; Ralph Trementozzi

(57) ABSTRACT

A system that incorporates teachings of the subject disclosure may include, for example, receiving a graphical representation of an object surface having a number of inscriptions indicative of information encoded upon the object surface. The graphical representation of the object surface is transcribed by the system to determine markings from the inscriptions. A number of alternative corresponding symbols are determined by the system. The alternative corresponding cuneiform symbols are determined from a number of the markings. A number of alternative transliterations are determined by the system. The alternative transliterations are determined from of a symbol of the multiple alternative corresponding symbols. A number of alternative translations are also determined by the system of a transliteration of the multiple translations transliterations. Other embodiments are disclosed.

19 Claims, 14 Drawing Sheets

(56) References Cited

OTHER PUBLICATIONS

Anderson, Sean E., and Marc Levoy. "Unwrapping and visualizing cuneiform tablets." IEEE Computer Graphics and Applications 22.6 (2002): 82-88.*

Lewis, A., and E. Ch'ng. "A photogrammetric analysis of cuneiform tablets for the purpose of digital reconstruction." International Journal of Heritage in the Digital Era 1.1 suppl (2012): 49-53.*

Mara, Hubert, et al. "Gigamesh and gilgamesh:-3D multiscale integral invariant cuneiform character extraction." Proceedings of the 11th International conference on Virtual Reality, Archaeology and Cultural Heritage. Eurographics Association, 2010.*

Willems, Geert, et al. "Easy and cost-effective cuneiform digitizing." (2005).*

Ch'Ng, Eugene et al., "A Collaborative Environment for Assisted 3D Reconstruction of Cuneiform Tablets", University of Birmingham, 2015, 4 pages.

Anderson, Sean E. et al., "Unwrapping and Visualizing Cuneiform Tablets", Computer Science Department, Stanford University, 2002, 11 pages.

"How to patent an algorithm in the US", Machine Learning, etc., Feb. 21, 2011, 4 pages.

* cited by examiner

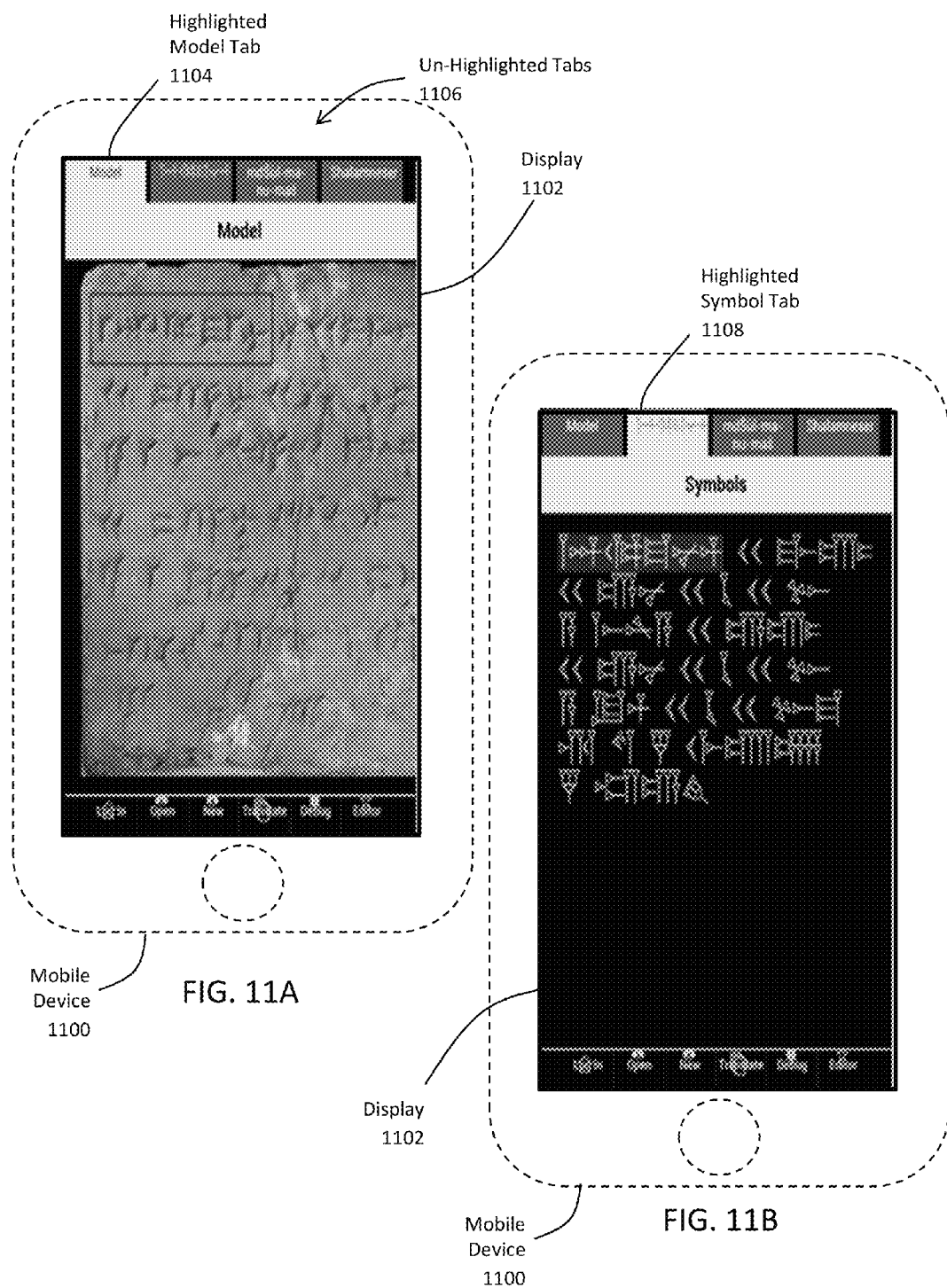

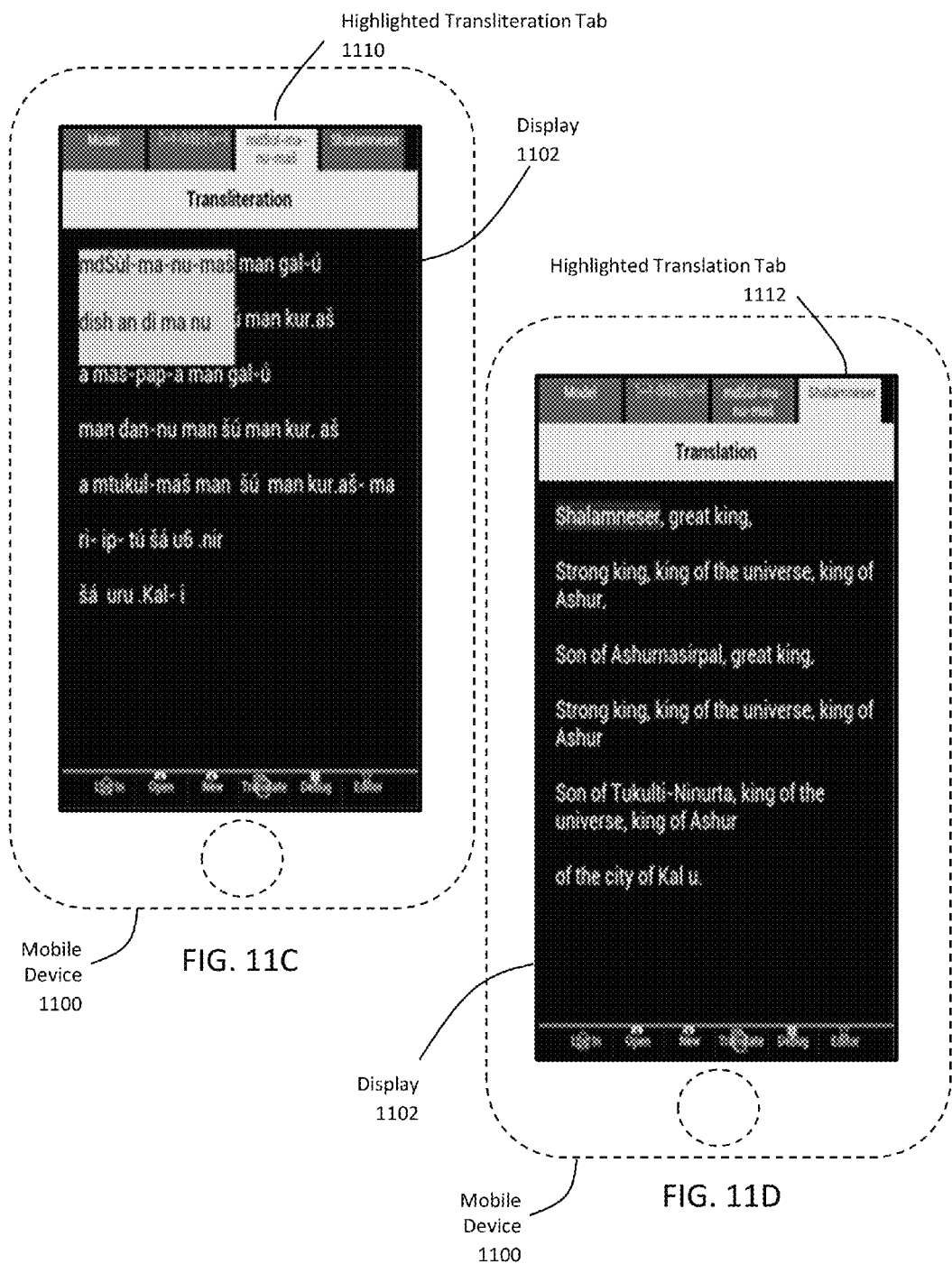

SYSTEM AND METHOD FOR AUTOMATICALLY TRANSLATING AN IMAGED SURFACE OF AN OBJECT

PRIOR APPLICATION

The present application claims the benefit of priority to U.S. Provisional Application No. 61/758,218 filed on Jan. 29, 2013, which is hereby incorporated herein by reference in its entirety.

GOVERNMENT LICENSE RIGHTS

This invention was made with Government support under Grant Award No. IIP-1330139 awarded by National Science Foundation. The Government has certain rights in the invention.

FIELD OF THE DISCLOSURE

The subject disclosure relates to a system and method for automatically translating an imaged surface of an object.

BACKGROUND

Ancient texts have been discovered at numerous archeological sites throughout the world. Much can be learned about ancient civilizations through interpretation of such texts. Unfortunately, translating ancient texts is not an exact science. The process is typically accomplished by a small number of highly skilled specialists, and only after a substantial investment of time for each text.

BRIEF DESCRIPTION OF THE DRAWINGS

Reference will now be made to the accompanying drawings, which are not necessarily drawn to scale, and wherein:

FIGS. 11A-11D depict a graphical user interface of an embodiment of the client device of FIGS. 1 and 2.

DETAILED DESCRIPTION

Figure 1:
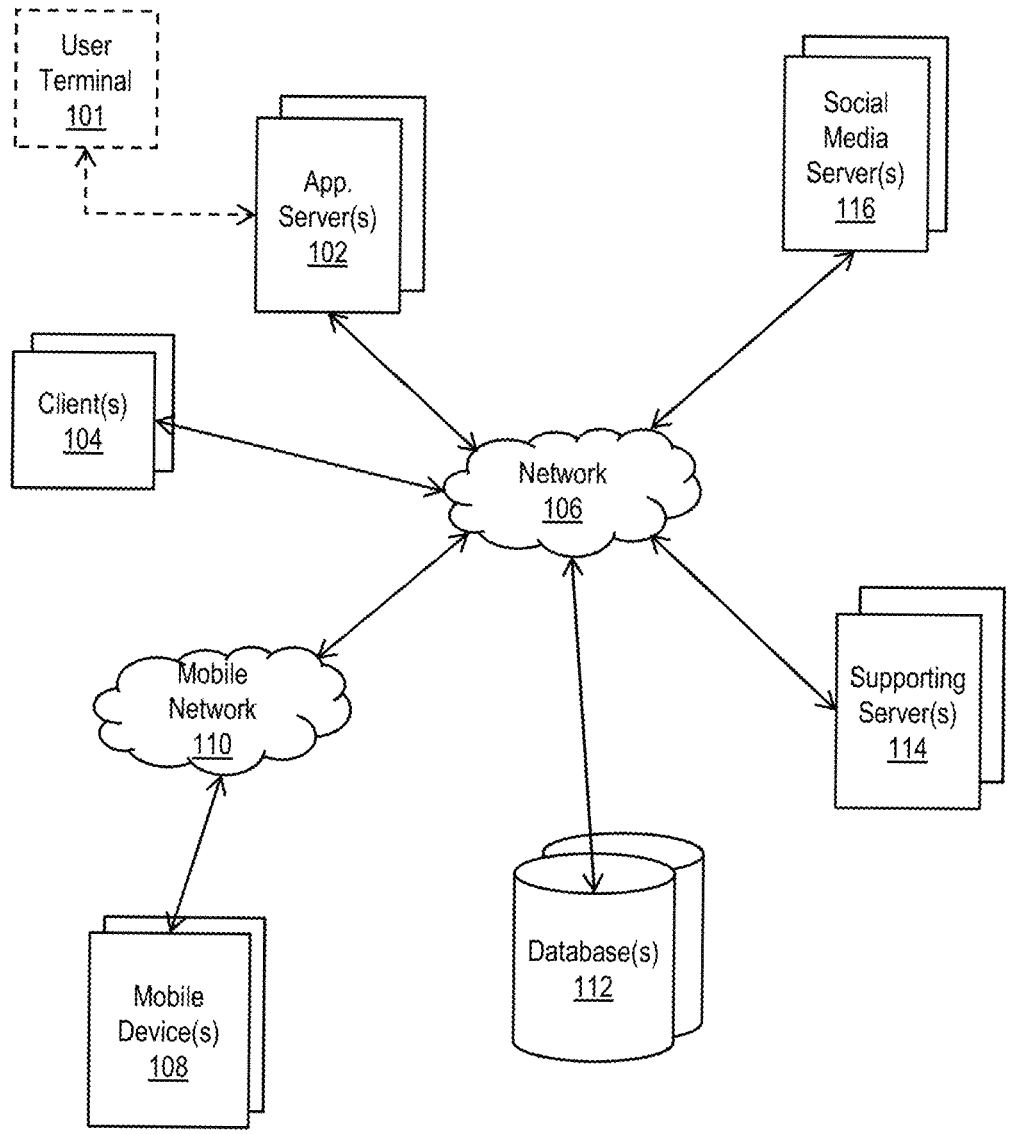
FIG. 1 depicts a functional block diagram of an illustrative embodiment of a translation system.

The subject disclosure describes, among other things, illustrative embodiments of system and method for automatically translating an imaged surface of an object. Other embodiments are included in the subject disclosure.

In one embodiment, a process includes receiving multiple photographic images of an object obtained from different positions relative to the object. The multiple photographic images are processed to determine a three-dimensional model of the object. A graphical representation of a surface of the object is determined from the three-dimensional model, having a number of inscriptions indicative of writing. The graphical representations of the object surface are received by a system having a processor. A number of inscriptions of the graphical representation of the surface of the object are transcribed to determine multiple markings. Multiple alternative corresponding symbols are determined by the system from at least one marking of multiple markings. Multiple alternative transliterations are determined by the system. The alternative transliterations are determined from of a symbol of the multiple alternative corresponding symbols. Multiple alternative translations are also determined by the system for a transliteration of the multiple transliterations.

In another embodiment, a mobile device includes a memory that stores executable instructions and a processor coupled to the memory. The processor, responsive to executing the instructions, performs operations including receiving a graphical representation of an object surface having multiple inscriptions. The inscriptions are indicative of encoded information. A selection of inscriptions of the multiple inscriptions is transcribed to determine multiple markings. Multiple alternative corresponding symbols are determined from at least one marking of the multiple markings. At least one symbol of the multiple alternative corresponding symbols is rendered for presentation on a display. Multiple alternative transliterations are determined of the at least one symbol of the multiple alternative corresponding symbols. A transliteration of the multiple alternative transliterations is rendered for presentation on the display. Multiple alternative translations are determined of a transliteration of the multiple alternative transliterations, and a translation of the multiple alternative translations is rendered for presentation on the display.

In yet another embodiment, a machine-readable storage device includes executable instructions that, responsive to being executed by a processor, cause the processor to facilitate performance of operations. The process includes receiving a graphical representation of an object surface having multiple inscriptions. The inscriptions are indicative of information encoded upon the surface of the object. A selection of inscriptions of the multiple inscriptions is transcribed to determine multiple markings. Multiple alternative corresponding symbols are determined from at least one marking of the multiple markings. The process further includes providing a symbol of the multiple alternative corresponding symbols for presentation on a display. Multiple alternative transliterations are determined of a symbol of the multiple alternative corresponding symbols. A transliteration of the multiple alternative transliterations is provided for presentation on the display. Multiple alternative translations are determined of a transliteration of the multiple transliterations. The translation of the multiple alternative translations is provided for presentation on the display.

Disclosed herein are technologies to reliably extract encoded information from a surface of an object. The encoded information can include inscriptions, e.g., of a writing, such as cuneiform, hieroglyphics, ancient Greek, Latin, ideograms and the like. The inscriptions include markings, such as lines, arcs, wedges, e.g., cunes, pictures, picture elements, etc. One or more markings can be grouped and transcribed into symbols, such as characters, letters, words and/or pictures.

The imaged surface can be obtained from multiple images, e.g., photographs, of the object taken from a variety of different positions. The writings can be inscriptions, e.g., formed by height variations of a surface. The height variations can be introduced as one or more of indentations as in cuneiform impressions formed into clay tablets, engravings and/or more generally in relief. Cuneiform is composed of wedge-shaped marks made with the end of a triangular stick. The relief can be high-relief in which more than 50% of a depth is shown, mid-relief and/or low-relief sometimes referred to as bas-relief. Alternatively or in addition, the writings can be formed by color contrast on a smooth surface, such as ink on paper or papyrus.

To support automatic and robust processing of such images, multiple innovative surface reconstruction, geometry processing, and geometry segmentation algorithms are disclosed herein, as well as several interactive tools to explore and operate on the captured data. Several examples of images of object of interest are captured with an imaging device, such as handheld camera, including a camera of a mobile communications device, from different points of view. Also disclosed herein are technologies to support translating and/or otherwise interpreting writing from the inscribed objects. The techniques can include automated and/or semi-automated translations in which a user provides one or more images of an object having inscriptions on its surface. The images are processed to obtain a graphical representation of elements of symbols of the inscriptions. For cuneiform writings, the elements or marks can be the cunes themselves, e.g., wedge shaped impressions or indentations formed in the surface of the object. Symbols or graphemes are determined according to one or more of the elements or cunes, and their meanings as clarified or otherwise interpreted. In some instances, symbols are characterized according to one or more of dates and cultural contexts.

Often, scribes did not separate the symbols within words so some writings, adjacent symbols may overlap or otherwise be positioned lending to ambiguity in an interpretation. A first step can include segmenting the inscription into separate symbols. In order to address such ambiguities, one or more alternative symbol interpretations for the same group of elements or cunes options can be provided. The symbols can be obtained by comparing groups of elements or cunes to known symbols, e.g., using one or more symbol dictionaries. The various options of symbol interpretations obtained from different dictionaries and/or different groupings of elements or cunes can be ordered or otherwise ranked, and in at least some instances, limited in number. One or more of the alternative symbol interpretations can be selected automatically and/or manually for further analysis.

The symbols of a particular inscription can represent one or more of phonemes of a spoken language, syllabaries, or logographies in which each symbol represents a word, morpheme or semantic unit. In at least some embodiments, a transliteration process converts the symbols to an alternative script or alphabet. To the extent the symbols represent phonemes of a spoken language, the transliteration would result in phonemes represented by one or more modern writing systems, or alphabets, such as the Latin alphabet. Similar approaches can be used for symbols representing one or more syllables and/or complete words or expressions.

FIG. 1 depicts an illustrative embodiment of a translation system 100. The system 100 includes a client device 104 that can include a translation process or application to allow users to perform translations of inscriptions. In some embodiments, the system includes one or more mobile devices 108. Each of the mobile device(s) 108 can similarly include a translation process or application to allow mobile users to perform translations of inscriptions. This is particularly beneficial for mobile users at an archeological location or perhaps a museum having artifacts inscribed with ancient texts. The translation processes or applications can be stand-alone applications operable without requiring assistance of a server. Alternatively or in addition, the translation client 104 and/or mobile device 108 applications can function cooperatively with one or more other devices.

In the illustrative embodiment, the system 100 includes one or more application servers 102 in communication with one or more of the client device(s) 104 by way of an intervening network 106 and the mobile device(s) 108 by way of one or more of the intervening network 106 and a mobile network 110. The application server(s) 102 can provide greater processing power than would otherwise be available to a client device 104 and particularly to a mobile device 108. In some embodiments, the application server(s) 102 are scalable. For example, a configuration of one or more servers can be established for a particular translation task and/or translation application. A single server may be sufficient for relatively light-weight translations of a less ambiguous writing, and/or a length of the inscription. Likewise, multiple servers may be necessary for relatively heavy-weight translations, e.g., of a highly ambiguous writing, and/or due to the length of the inscription.

In some embodiments, the system 100 includes one or more supporting components. The supporting components can include one or more supporting servers 114, e.g., accessible to one or more of the client(s) 104, the mobile device(s) 108 and the application server(s) 102 by way of the network 106. Alternatively or in addition, supporting system components can include one or more storage devices and/or databases 112 and/or one or more social media servers 116. The various system components can act cooperatively, e.g., under the direction of one or more of the client device(s) 104, the mobile device(s) 108 and/or the application server(s) 102. In the illustrative embodiment, an optional user terminal 101 is shown in phantom in communication with one or more of the application server(s) 102. The user terminal 101 can be used to access or otherwise run a translation process directly from the application server(s) 102 without having to rely on either the client(s) 104 or the mobile device(s) 108.

Figure 2:
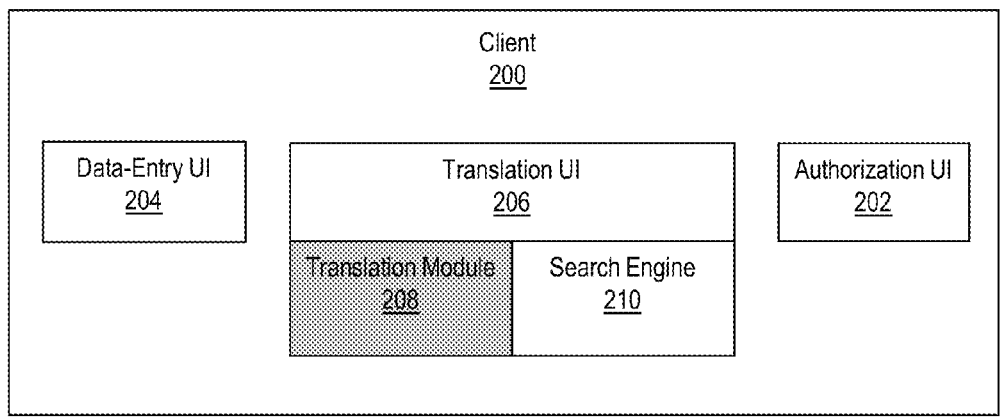
FIG. 2 depicts an illustrative embodiment of a client interface of the client device of the translation system of FIG. 1.

FIG. 2 depicts an illustrative embodiment of a client interface 200 of the client device of the translation system of FIG. 1. The client interface 300 can be provided by a mobile device 108 (FIG. 1), e.g., by way of an Android® device and/or an Apple® iPhone® or iPad®, each running a translation application or app' according to the techniques disclosed herein. Features of the client interface 200, such as the data-entry user interface (UI) 204 can include a camera on phone or tablet to take photos. It is understood that apps and/or supporting material, such as blocks of translations, e.g., by count and/or time period, can be procured online by any suitable means, such as the Apple® and/or Android® ecosystems.

The client interface 200 includes multiple user interface components including an authorization UI 202, a data-entry UI 204 and a translation UI 206. The UI components 202, 204, 206 of the client interface 200 can be implemented as one or more of a graphical user interface, a textual user interface, an audio user interface. For example, the authorization UI 202 can present a graphical display requesting user identification. The authorization UI 202 can include one or more of a stand-alone login and a social media login. To that end, the authorization UI 202 can include an input to accept an indication of user authentication. Such inputs can be textual, e.g., accepting a username and/or password, audio, e.g., accepting a voice command, or graphical, e.g., accepting a touchscreen entry. Alternatively or in addition, the authorization UI 202 can include any suitable means for identifying a user, including biometric detectors, e.g., fingerprint scanners, cameras, microphones, retinal scanners, and the like.

The data-entry UI 204 can be used, e.g., to create an object and/or entry for input to the translation process. The data-entry UI 204 can include features to support submission of images, e.g., photographic images and/or to support or otherwise initiate the translation process. For example, the data-entry UI 204 can present a textual UI accepting user typing, writing and/or selecting options in a point-and-click manner. Such inputs can be used to enter and/or otherwise modify attributes related to one or more of a series of images of a particular inscription and/or to accept supporting information related to the translation. Related information can include identification of one or more of a geographic location of the inscribe object, an estimate of a date or era of the inscription, reference labels and/or markings, etc. The data-entry UI 204 can present a graphical UI accepting user selection of graphical elements, such as soft buttons, annotating regions of a display, e.g., with geometric markings, such as lines, curves, text and/or closed surfaces including circles, ovals an polygons. The data-entry UI can include features to perform one or more of image capture, e.g., by way of a camera, laser and/or optical scanner.

In at least some embodiments, the translation UI 206 can be used to provide user interaction with one or more of a translation module 208 and a search engine 210. The translation module 208 can be used to obtain translations and to support user entries to select or otherwise choose among alternatives or variations of a particular translation. For example, particulars related to the location, age, civilization, etc., can be obtained from a user by way of the translation UI 206 and used to control the translation module 208. Likewise, one or more details, including partial and/or proposed symbols, transliterations and/or translations, can be supported by results obtained by a search engine module 210. The search engine module 210 can be used to look up symbols and/or words, to find similar inscriptions and/or text and to find related objects, e.g., related symbols. For example, search results for a particular symbol, combination of symbols, transliteration, etc., can be entered by the search engine module 210 as search string(s) to be run on one or more search engines to obtain external information to support a particular translation.

Figure 3:
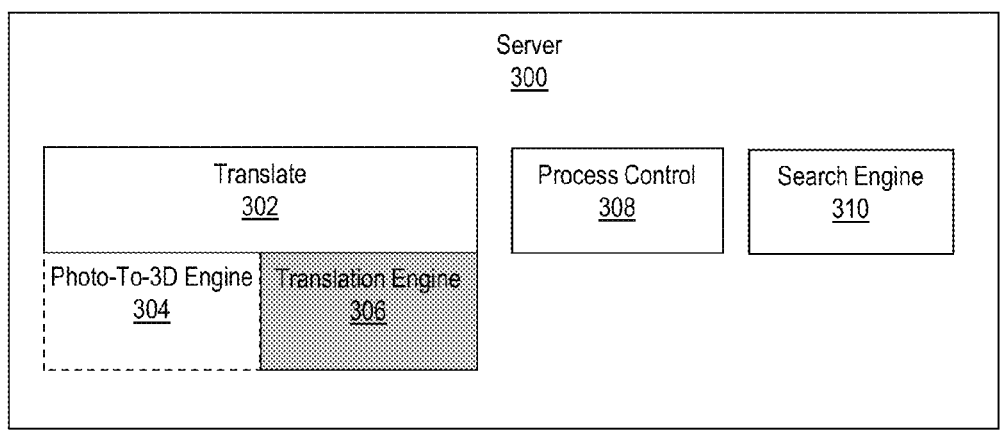
FIG. 3 depicts an illustrative embodiment of a server interface of the server device of the translation system of FIG. 1.

FIG. 3 depicts an illustrative embodiment of a server 300 of the translation system of FIG. 1. The server 300 includes four main processes running on the server: a process or job controller 308, an image processing module 304, e.g., performing photo-to-3D model generation and surface unwrapping, a translation process or module 302 and, in at least some embodiments, a search engine process or module 310.

The job controller process 308 performs activities, such as, managing a work queue, starting and stopping jobs, running individual processes within a job, monitoring server heartbeats, and reassigning jobs if a server goes away. A job is typically made up of a sequence of executables. Data may be passed through the database or through files. An executable can report status through a return value, a status file, or in a database log table. In addition, results of "standard out" and "standard error" can be captured and preserved in the job log. Jobs are added to the queue when a user generates a 3D model, starts a translation, or makes a significant change to a translation requiring that the translation be updated can be provided as input data. Jobs can provide output including status, runtime, and job-specific output data. One or more scheduling algorithms, e.g., round-robin, can be applied with priority given to translations.

One or more of the translate module 302 and the process control 308 can be used to adjust operation of the translation module or engine 302 through user feedback, e.g., moderated by user ranking.

In at least some embodiments, the image processing engine 304 includes processes to repair or otherwise enhance captured photographic images of the object. This can include image processing techniques to identify one or more of dents, cracks and/or chips on the surface that might otherwise inhibit a proper translation. Other image processing techniques can be used to reject and/or repair one or more of the photographic images and/or the 3D model of the imaged object in view of such surface defects. Rejection of a damaged region can be used to qualify translation results or otherwise avoid obtaining translations from affected areas.

A photo-to-3D processing job is submitted when a user selects photos using the client UI 200 and starts the process to generate a model. The processing is implemented as a sequence of executables that perform the separate processing steps. They include locating camera positions associated with each of the photos, lens parameterization, generating 3D points for the model, and generating a 3D model surface. The user display is either a 3D model, or an unwrapped surface that is displayed as an image, depending on the capability of the mobile device. List of photographs, model name, job information, temp directory to operate in can be provided as input data. A 3D surface model, optionally including a 3D point cloud model, can be provided as output.

The translation engine 306 can be used to obtain translation results of portions of an imaged surface of the high-resolution 3D model. There are two variations of translation job, a full end-to-end translation and an incremental update translation performed when the user has made alternative selections that invalidate succeeding stages of the existing translation. Initially, the translation process job is submitted when the user has viewed the 3D model (or unwrapped 3D model surface) on the client UI 200, selected an area of the unwrapped 3D model surface that contains the inscription, indicated the typical size of a wedge, and clicked the button to start translation. It is understood that in at least some embodiments image recognition techniques can be used to locate the inscription and find the wedge size automatically.

An initial translation pass can be performed end-to-end (assuming no show-stopping errors). Sufficient internal data can be stored locally and/or in an external storage system or database 112 (FIG. 1) so that succeeding incremental translations do not have to re-run the entire process. When a mobile app users makes a significant modification to previously run translation that invalidates succeeding stages, an incremental translation job can be triggered to use the previously stored data, e.g., from the end-to-end run and to update only those stages that need to change. In some embodiments, the translation process roughly emulates a traditional translation approach, e.g., first figuring out what the symbols are from the wedges in the inscription, transliterating the symbols, and translating the transliteration. The processing steps are tightly integrated because discoveries made at later steps may provide feedback to help resolve ambiguities at earlier steps.

The output from each of the stages provides an estimate, or "best-guess" along with one or more of the most likely alternatives. The top most likely alternatives can be returned to a user interface of the client 200, e.g., a mobile interface of the mobile device 108 (FIG. 1). The mobile interface allows the user to choose between the alternatives. If the user makes significant changes to earlier steps in the translation, it may be necessary to re-run the follow-on translation stages again. Depending on the ranking or stature of the user, the choices are fed back to the server to use as input to modify the weightings for future translations.

In at least some instances, such examples of user supplied input can be ranked or otherwise ordered. For example, user supplied content can be weighted according to a skill, proficiency and/or stature of a particular user. Inputs related to suggestive results, such as translation alternatives can ranked lower for base users, whereas suggestions for proficient users can carry some weight for ranking in one or more of the translation engine 306 and according to feedback from other users. Likewise, opinions and/or suggestions of expert users can be used to drive both automatic translation ranking and user rankings. Integrity of any user's identity can be assured using a trusted form of user authorization. In at least some embodiments, user rankings can be moderated by experts in a fashion similar to that used on collaboratively edited resources, such as collaboratively edited encyclopedias, such as, Wikipedia®, a registered trademark of the Wikimedia Foundation, Inc., San Francisco, Calif., or that used by collaborative news publications, such as, Slashdot®, registered trademark of BlockStackers, Inc., St. Holland, Mich.

The translation results can include interim results, such as a cune segmentation of a series of surface marks to estimate or otherwise identify a group of cunes associated with a symbol. The translation results can further include a symbol lookup, e.g., for segmented cunes, to obtain one or more corresponding symbol(s). A transliteration process can be applied to the symbol results to provide a number of alternative transliterations. Likewise, a translation process can be applied to one or more of the transliteration results to provide translated text in a language of choice. Translation results can be in a modern language, such as English or French, or in an ancient language, such as Latin.

In some embodiments, the translate module 302 includes or is otherwise in communication with one or more of an image processing engine 304 and a translation engine 306. The image processing engine 304 can generate a three-dimensional model of an inscribed object, e.g., according to a photo-to-3D engine 304. The image processing engine 304 can process a multitude of high-resolution photographic images of an object from various different perspectives to obtain a high-resolution 3D model of the inscribed object. The 3D model includes sufficient detail to identify or otherwise distinguish inscriptions on one or more surfaces of the object.

In at least some embodiments, the server 300 can include a search engine module 310. The search engine module can be used to perform look-up tasks related to one or more aspects of a translation. By way of example, the search engine module 310 can be used to accomplish one or more of a cune lookup, a symbol lookup, a phrase lookup, a similar text lookup and/or a related objects lookup. In some embodiments, users of the translation app add one or more of photos, models, translations alternatives to one or more databases. One or more types of such user-supplied materials can be searched or otherwise used in determining current and future translations.

By way of non-limiting example server environment can include Apache web servers, MySQL database servers, file servers, and batch servers for photo-to-3D and translation-rule jobs.

Figure 4:
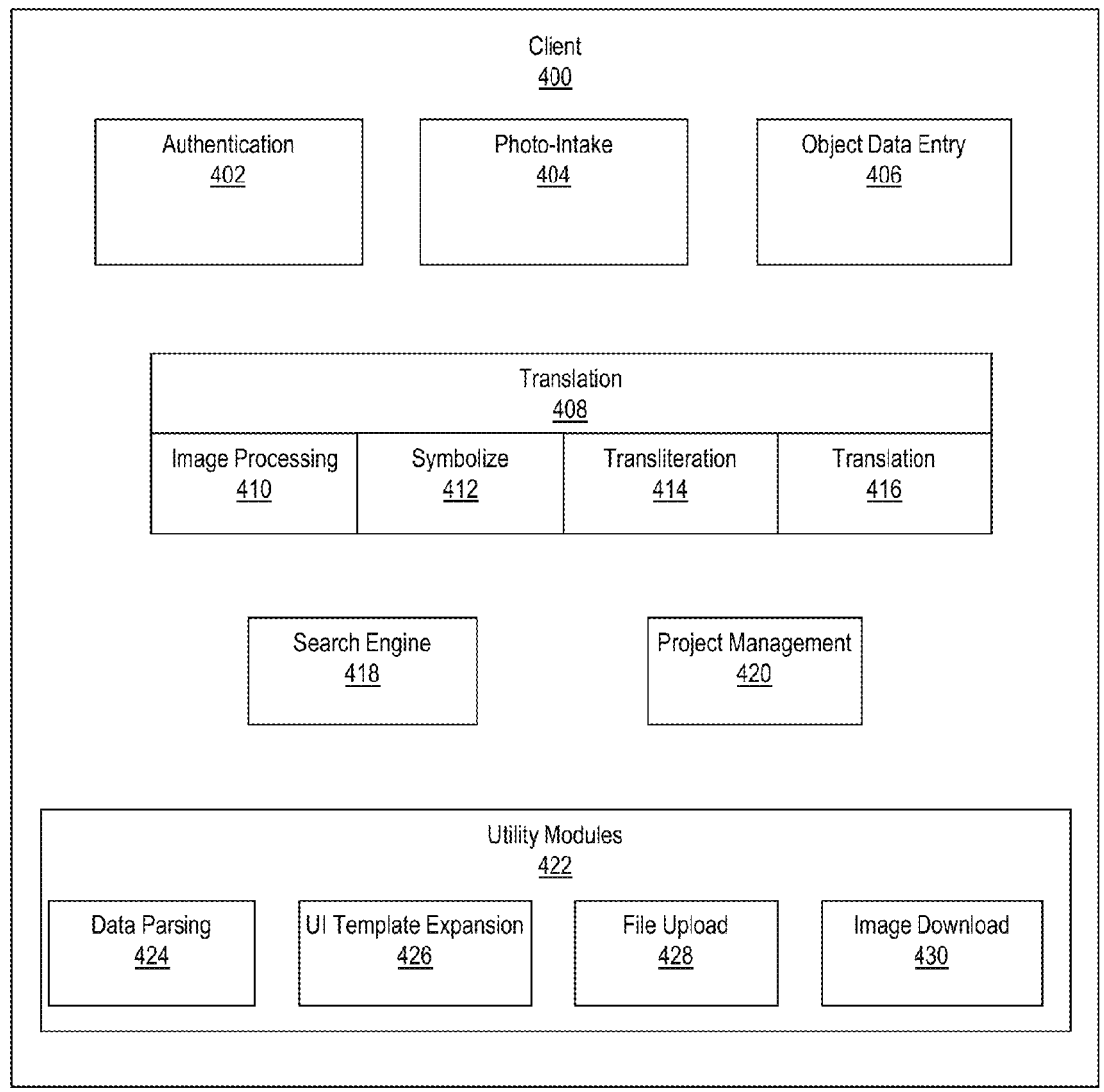
FIG. 4 depicts an illustrative embodiment of client modules of the client device of the translation system of FIG. 1.

FIG. 4 depicts an illustrative embodiment of client modules of a client device 400 of the translation system of FIG. 1. The client device 400 includes an authentication module 402, a photo intake module 404 and an object data entry module 406. The photo intake module 404 can be used for one or more of selecting previously stored photographic images, e.g., from a camera file of a mobile device 108 (FIG. 1), or from another source such as local or remote storage including a database 112. Alternatively or in addition, the photo intake module 404 can be used to take photographs, e.g., using a camera of the mobile device 108, to display selected photos, e.g., on a display of the mobile device 108, to remove photos and/or to upload or update photograph images to the server 102 (FIG. 1).

The object data entry module 406 can be used to obtain user supplied data and/or automatically generated data, such as timestamps, geolocation coordinates, device orientations, e.g., compass headings, or position sensors, ambient lighting, etc.

The client module 400 further includes a translation module 408 comprising one or more of an image processing module 410, a symbolize module 412, a transliteration module 414 and a translation module 416. The image processing module 410 can include an unwrapping algorithm, e.g., to transform an image obtained from a 3D surface of an object to a two-dimensional representation. Other features of the image processing module 410 can include features to add or otherwise modify imaged inscription elements or cunes. The symbolize module 412 can include algorithms to match groups of one or more cunes to symbols, and in at least some embodiments can include a look up function, e.g., for accessing a dictionary of symbols. The symbolize module 412 can include features to present a number of symbol alternatives for the same group of cunes, e.g., allowing a user to choose from among the number of symbol alternatives.

The transliteration module 414 performs a transliteration of one or more symbols, e.g., of a chosen symbol alternative, to provide a transliteration of the symbols. In at least some embodiments, the transliteration module 414 presents a number of alternative transliterations for the same symbol alternative, e.g., allowing a user to choose from among the number of alternative transliterations. In at least some embodiments, the transliteration module 414 includes features to allow one or more of words or phrases to be looked up.

The translation module 416 performs a translation of one or more transliterations, e.g., of a chosen transliteration alternative, to provide a translation of the chosen transliteration of the chosen symbols. In at least some embodiments, the translation module 416 presents a number of alternative translations for the same transliteration alternative, e.g., allowing a user to choose from among the number of alternative translations. In at least some embodiments, the translation module 416 includes features to allow one or more of words or phrases to be looked up.

Other supporting modules of the client 400 include a search engine module 418, e.g., for looking up similar text and/or finding related objects, a project management module 420, e.g., to perform executive and/or control functions, such as selecting existing translation components, and/or starting a new translation project. As for selecting an existing translation project, it is understood that choices made at any stage of the translation can be repeated to obtain alternative results. Thus, results including alternatives can be stored, at least temporarily, to allow earlier choices to be revisited. Choices made during a translation can be hierarchal, such that a revised choice at a lower level, e.g., at the symbol or transliteration stage, can require a revised translation. The revised result can be performed automatically, e.g., without further choices, for example, using prior choices to the extent possible. Alternatively the revised result can be performed automatically in response to updated choices for preceding steps in the translation process.

In at least some embodiments, the client 400 includes one or more additional utility modules 422. By way of non-limiting example, such utility modules 422 can include a data parsing module 424, e.g., performing parsing of JavaScript Object Notation (JSON) data, a file upload module 428, e.g., for uploading photographic images, and an image download module 430, e.g., for downloading or otherwise storing one or more of photographic images assigned to a particular translation project and/or unwrapped models of 3D object surfaces. A UI template expansion module 426 can be used to support user interface of one or more of translation pages, search pages and/or to provide information popups.

Figure 5:
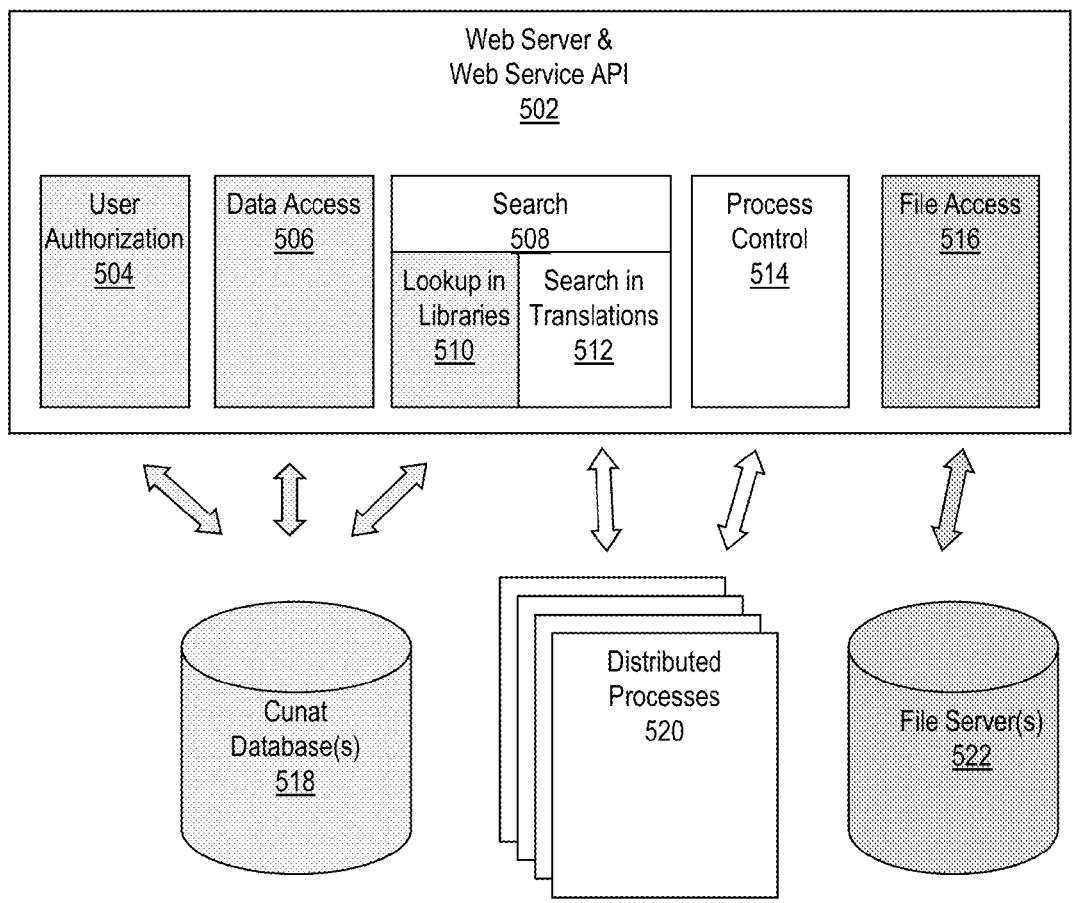
FIG. 5 depicts an illustrative embodiment of an architecture of a sever of the translation systems of FIG. 1 and FIG. 3.

FIG. 5 depicts an illustrative embodiment of an architecture 500 of a sever 102, 300 of the translation systems of FIG. 1 and FIG. 3. The server architecture 500 includes a web server application programming interface (API) 502. In at least some embodiments, the web server API 502 includes a representational state transfer (REST) or RESTful web service API. REST is generally known to define a set of architectural principles by which Web services can be designed that focus on a system's resources, including how resource states are addressed and transferred over HTTP by a wide range of clients written in different languages.

According to the illustrative embodiment, the web server API 502 includes one or more of a user authorization API 504, a data access API 506, a search API 508, a process control API 514 and a file access API 516. The search API 508 can include APIs to support library lookup 510 and/or translation searches 512. As further illustrated, at least some of the APIs of the web server API 502 can be used to interact with one or more databases 518. In the illustrative example, one or more of the user authorization API 504, the data access API 506 and the library lookup API 510 are used to interact with a database 518. The database 518, in turn, can provide one or more of object data, project data, translations, symbol libraries, translation libraries authorization data and other supporting data, such as copyright data.

Likewise, the search-in-translation API 512 and the process control API 514 can be used to support interaction with one or more distributed processes 520. The distributed processes 520 can include one or more of job controller process, a photo-to-3D process, a 3D surface unwrapper process, a 3D cune-finder process, a symbol segmentation process, a transliteration process, a translation process and a search-in-translation process. The file access API 516 can be used to support interaction with one or more file servers 522. The file server(s) 522 can provide, e.g., one or more of photographs and/or 3D models.

In more detail, the job controller process of the distributed processes 520 can perform one or more of starting or stopping a particular job, monitoring or otherwise providing a heartbeat indication of the job and in at least some instances, updating or otherwise maintaining a log related to jobs.

The photo-to-3D process of the distributed processes 520 can perform one or more of detecting features in a photographic image file. Examples of features can include detecting lines, surfaces, distinguishing an object from a background and the like. The photo-to 3D process can further include other functions, such as calculating lens parameters of a camera used in obtaining photographic images, locating photographs in a 3D space, e.g., to support a relative perspective of each photograph of a series of photographs of a common inscribed object. Still other features include generation of a 3D point cloud and/or generation of a 3D surface model.

The 3D surface unwrapper process of the distributed processes 520 can perform one or more of determining local normals of a 3D model, locating edge breaks and flattening local surfaces. The 3D cune-finder process of the distributed processes 520 can perform one or more of determining an inscription area, e.g., according to a user input, determining an up direction, determining a cune size, determining a surface, adjacencies, and the like. The symbol segmentation process of the distributed processes 520 can match cunes to symbols, whereas each of the transliteration and translation processes can apply unification grammar rules, and/or an "N-gram" lookup, e.g., a lookup of a contiguous sequence of n items from a given sequence of text. The search in translations process of the distributed processes 520 can be used to support parallel searches.

Project data associated with the various processes disclosed herein includes, without limitation one or more of lists of photographic images, 3D models, unwrapped, e.g., flattened models, cune lists, symbol lists, transliterations, translations, object data and copyright data. Certain types of project data are relevant to particular processes of the distributed processes 520. For example, the photo-to-3D process receives a photograph list and returns a 3D model determined from the photographic images identified in the photograph list. The 3D surface unwrapper process receives a 3D model and returns an unwrapped model determined from the 3D model. The 3D cune-finder process receives the unwrapped model and returns a cune list of cunes determined from the unwrapped model. The symbol segmentation process receives the cune list and returns a symbol list determined from the cune list. The transliteration process receives the symbol list and returns a transliteration determined from the symbols of the symbol list. The translation process receives the transliteration and returns a translation determined from the transliteration.

The search in translations process receives one or more of the cune list, the symbol list, the transliteration, the translation, object data and copyright data to be used in parallel searches. Search results can be provided to the appropriate process. For example, search results of cune list can be provided to the symbol segmentation process. Likewise, search results of the symbol list can be provided to the transliteration process, and search results of the transliterations can be provided to the translation process.

Cuneiform was developed by the Sumerians for the Sumerian language. Each symbol maps to one or more Sumerian logograms, each with a later translation, such as an Akkadian translation. Each cuneiform symbol can also have a phonetic pronunciation that allows languages like Akkadian to be spelled phonetically using cuneiform symbols as phonemes. However, there are multiple cuneiform symbols for many of the phonemes, so the same Akkadian word can be spelled many different ways. Phonetic spelling of Akkadian was not sufficient so some symbols can become determinatives that don't generate output but specify how to interpret other words in the sentence. Scribes used logograms, phonemes, and determinatives, so the resulting ambiguity can only be resolved by feedback from the translation semantic stage.

The techniques disclosed herein use libraries of unification grammar rules in PATR-II computational linguistic format to parse the symbols from the segmentation process. PATR-II refers to a linguistic formalism used in computational linguistics, using context-free grammar rules and feature constraints on the rules. PC-PATR is an implementation of PATR-II for PC and Unix systems. The transliteration graph is first matched to low-level word- and phrase-structure rules. Then it unifies the low level rules with matching higher level sentence-structure rules. It continues matching and unifying until the structure of the input has been fully resolved (a detailed description of unification grammar is beyond the scope of this document). Unlike other unification grammar engines, a translation engine can handle missing input by unifying and executing partially matching rules. Three steps encompass the translation path: transcribe the Akkadian, translate the symbols to meaning, and translate to English.

Figure 6:
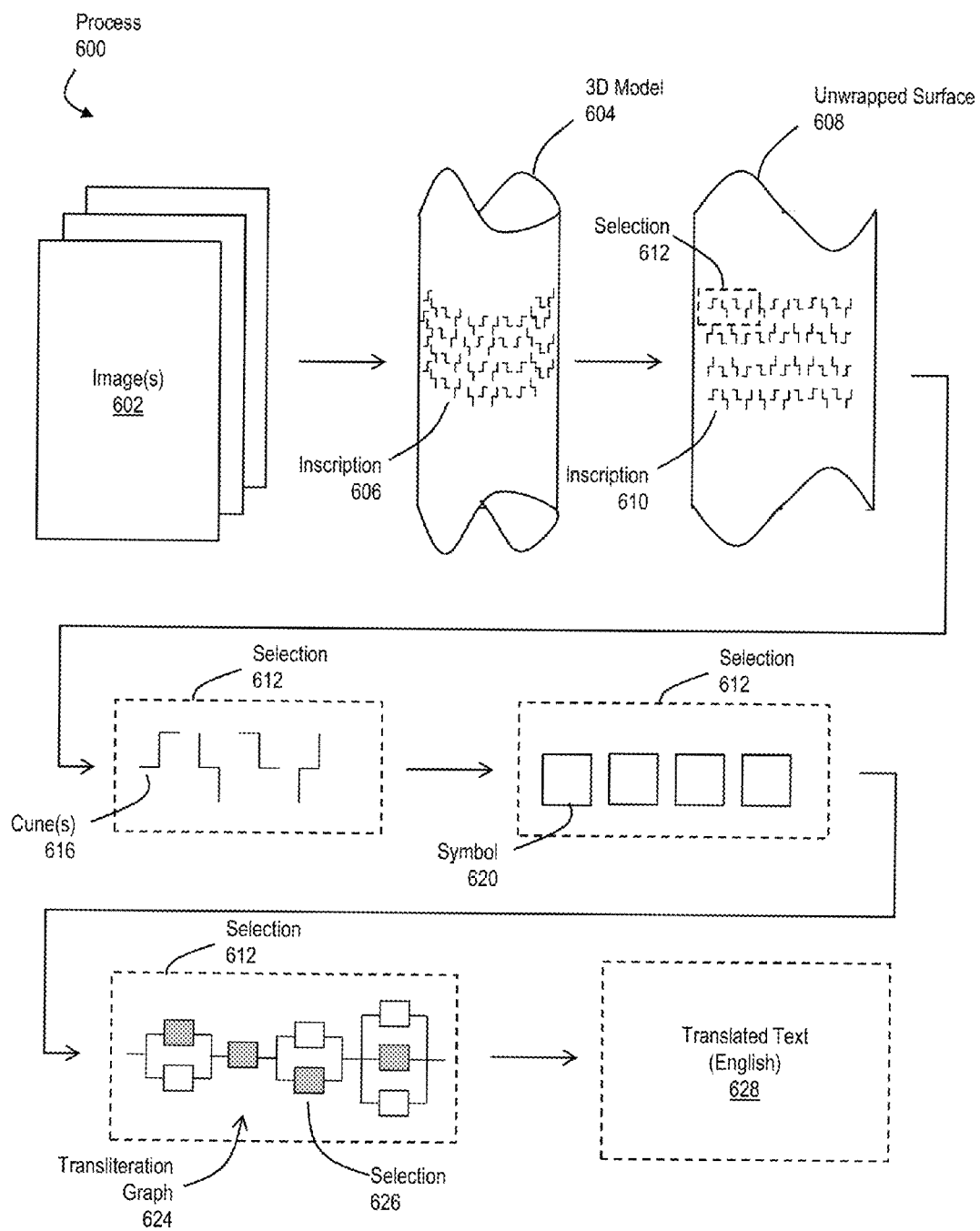
FIG. 6 depicts a graphical representation of an embodiment of a translation processes of a translation system of FIGS. 1-5.

FIG. 6 depicts a graphical representation of an embodiment of an over-arching translation processes 600 of a translation system of FIGS. 1-5. A multitude of photographic images 602 of an inscribed object are obtained from a variety of different perspectives. The images 602 are processed to determine a high resolution 3D model of the inscribed object 604, ideally, having sufficient resolution to distinguish details of the inscription. If the object is not flat, an inscribed surface or portion of an inscribed surface of the 3D model is unwrapped. The resulting unwrapped surface 608 provides a flattened version of the portion of the inscribed surface of the 3D model. In some embodiments, a user can make a selection 612 of a region of the inscription 610 of the unwrapped surface 608. The selection 612 can be subjected to further analysis, e.g., by way of translation.

Individual markings or groups of cunes 616 appearing within the selection 612 are analyzed to determine corresponding symbols 620. The symbols 620 are analyzed to determine transliteration alternatives graph 624. Selections 626 among the alternatives of the graph are recorded and a translation performed according to the selections to result in translated text 628 representative of the original selection 612 of the inscription. At each step, alternative interpretations are stored in parallel paths of acyclic directed graph structures.

Syntactic rules can be applied identify sentence structure while semantic rules can be applied to identify who, what, why, when, where information. Additional semantic rules look for structural forms like repeating adjectival phrases found in royal inscriptions, repeating patterns of numbers and food stuffs/materials found in receipts and records, and names of deities found in temple inscriptions. To cope with ambiguous data, the process can rate rules based both on constraint matches and estimates of whether unmatched constraints might unused data in the graphs. Highest rated rules are unified.

When unification completes, the highest n (optimization parameter) ranked rules associated with each transliteration branch are kept. Branches with low ranking rules are pruned away. The process picks the highest-rated rules and works back down the grammar rules and tries to fill in unmet constraints from unprocessed transcription graph branches. Finally, the higher ranking translation rules are executed to complete the sentence-structure graph, common-topic graph, and the document-structure graph. Together, these graphs form a generic interpretation of the input that can be translated to any output language.

Figure 7:
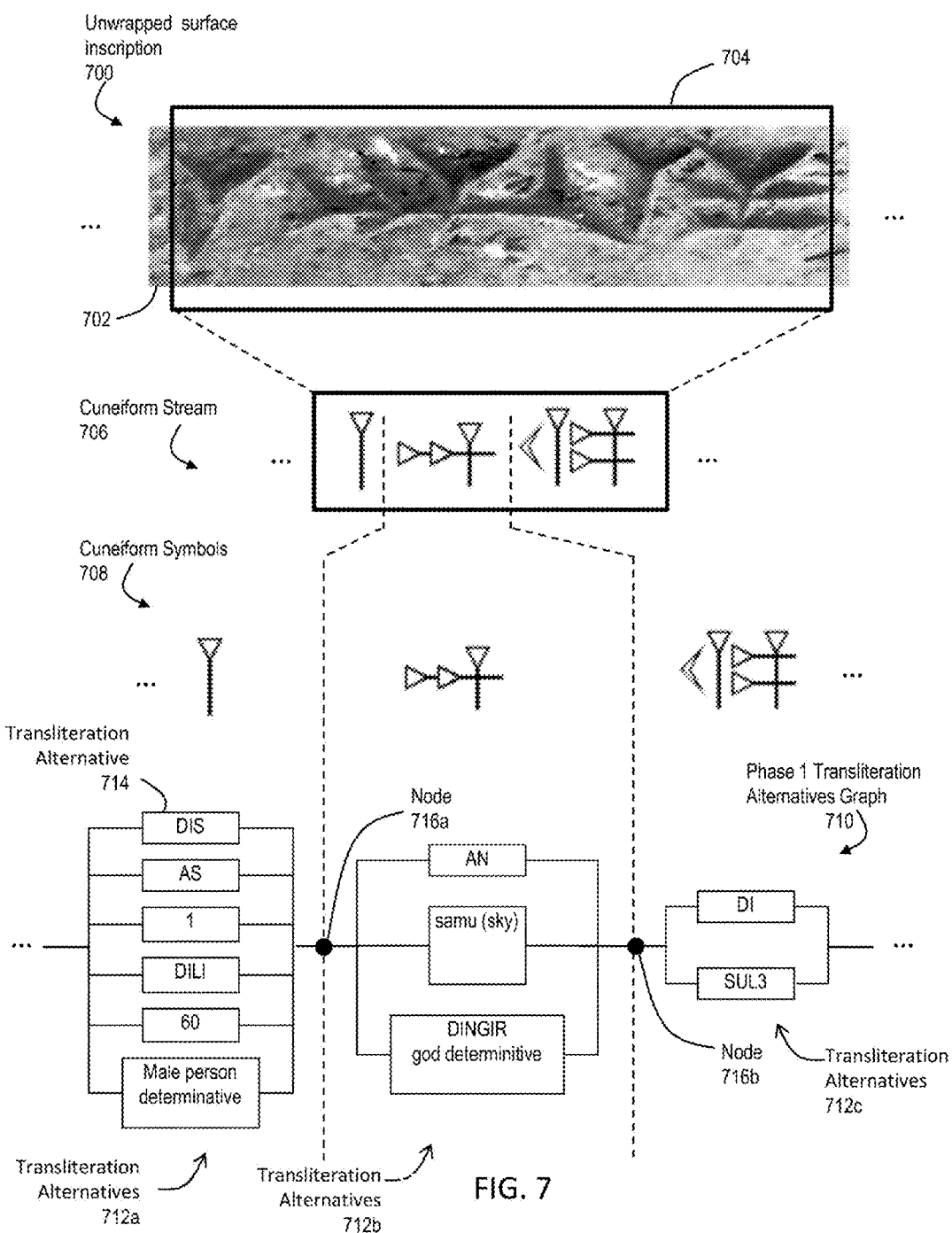
FIG. 7 depicts a graphical representation of an embodiment of symbol and transliteration processes of a translation system of FIGS. 1-5.

FIG. 7 depicts a graphical representation of an embodiment of symbol and transliteration processes of a translation system of FIGS. 1-5. The process begins with an unwrapped surface inscription 700 obtained from a 3D model of an inscribed object. A portion of the unwrapped surface inscription 700 can be highlighted, e.g., bounded by a rectangle 704. In the illustrative example, the rectangle 704 can be determined by a user by placing a graphic image of the rectangle 704 on the image of the unwrapped surface inscription 700 to identify a portion of the image to be translated.

An illustration of a resulting graphic representation of a cuneiform stream 706 is shown. The graphic representation is a direct representation of, in this instance, cunes appearing on the unwrapped surface inscription 700. The cuneiform stream 706 is parsed into distinct cuneiform symbols 708. In the illustrative example, a first group of transliteration alternatives 712a are determined and are illustrated as a graph element 712a. The graph element 712a includes the alternative transliterations 714 as parallel branches of the graph joined at a common node 716a between an adjacent symbol of the parsed cuneiform symbols 708. Likewise, second and third transliteration alternatives 712b, 712c determined, also illustrated as graph elements having parallel branches and joined at nodes 716a, 716b between adjacent parsed cuneiform symbols 708. The resulting graph is referred to as a first phase of a multi-phase transliteration alternatives graph 710, capturing alternative transliterations for each parsed cuneiform symbol 708 of the selected area within the rectangle 704.

The multiple languages and dialects of an inscribed writing are implemented in multiple symbol libraries. In one embodiment, the Akkadian language library is provided supporting only related dialects found in inscriptions. Each symbol library contains a list of strokes for each symbol, a list of features specific to each symbol, and an index that identifies the symbols that contain each feature. The segmentation process scans the input stream for features, matches them to features in the symbol libraries, uses the individual strokes to identify which symbols match the input stream, and puts the identified symbols in the transliteration graph. When the input stream is ambiguous, the alternative symbols will be stored as parallel paths in the graph.

Figure 8:
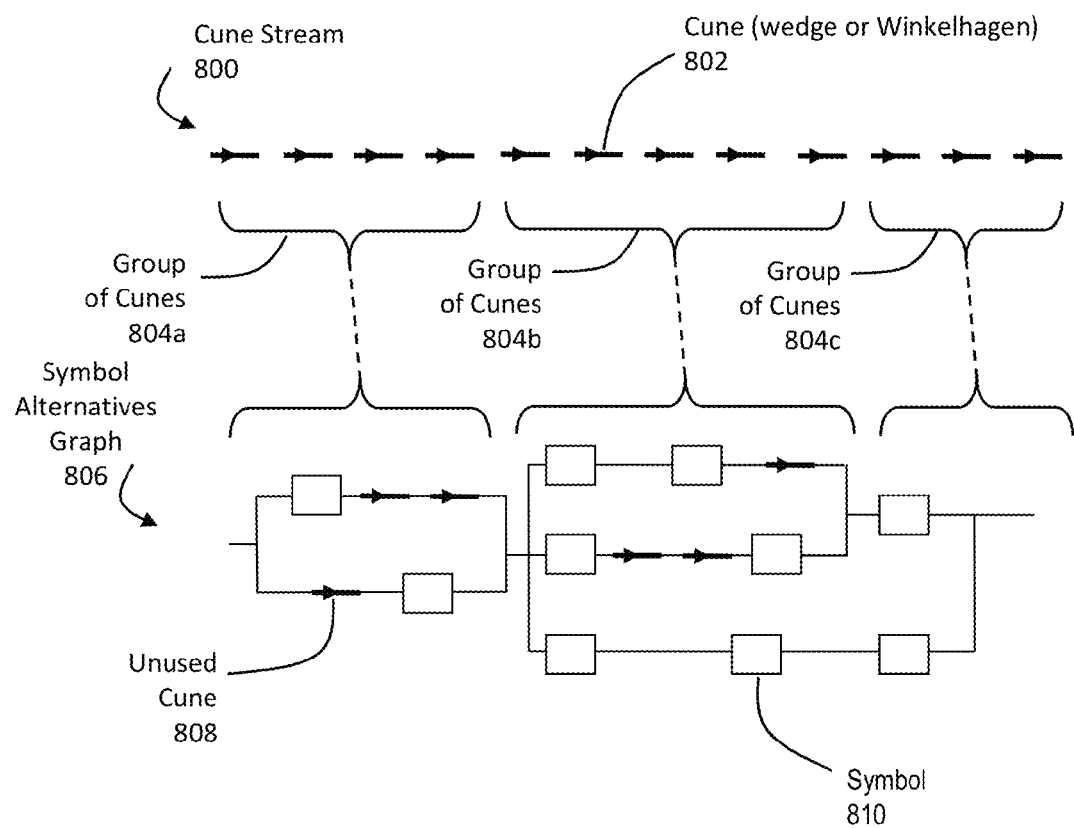
FIG. 8 depicts a graphical representation of an embodiment of symbol association processes of a translation system of FIGS. 1-5.

FIG. 8 depicts a graphical representation of an embodiment of cune-to-symbol segmentation/transcription process of a translation system of FIGS. 1-5. Certain writings, such as cuneiform, do not have clear boundaries between symbols. Moreover, ancient artifacts, such as clay tablets, often have wear, cracks, and other damage that obscures any inscribed writing. Consequently the segmentation of symbols requires a robust process and benefits from feedback from succeeding steps to refine the segmentation.

A stream of cunes 800 including a stream of individual cunes 802 is processed to segment the stream of cunes 800 into groups of cunes 804a, 804b, 804c that correspond to likely symbols 810. A forward part of the process uses a feature-based search to segment the stream of cunes 800 into likely symbols 810. The feature based search can rely on one or more symbol libraries. Multiple symbol libraries can result from different periods and locations using different symbol sets.

A feedback portion of the of the cune-to-symbol segmentation/transcription process uses statistical data to predict what the cunes 802 are likely to be there and then checks the input stream 800 to determine which predictions are most likely. In an alternative approach, this feedback step is accomplished during a cune finding process, e.g., before a cune stream 800 has been determined.

The library or libraries to search can be selected based on the time period and geography entered by the user when describing the object. If the user has not selected any period or geography, some selection, e.g., all libraries, will be tried. The libraries that apply best will be used to suggest time period and geography to the user.

An output of a 3D cune-finder process can be described in standardized form, such as an XML file. An XML file can contain a number of rows (a single row, if there is no clear demarcation). For each row, there is a list of cunes, in which each cune is defined as a type (e.g., a wedge or angular hook, such as a Winkelhaken, or more if using definitions of compound symbol fragments, such as crossed wedges), x, y offsets from a reference, such as an arbitrary zero to a center of a broad head of the wedge, a rotation in degrees (e.g., with 0 being in a direction of a character up vector), and a length. A sample format is provided in Table 1 below.

TABLE 1

Example XML File Format of Cunes.

```
<?xml version="1.0" encoding="utf-8"?>
<cunelist xmlns="http://www.learningsites.com/cunat/v1/cunelist/">
    <row length="3">
        <cune type="wedge" posX="20.0" posY="13.5" angle="90" length="1.0"/>
        <cune type="wedge" posX="20.5" posY="13.0" angle="0" length="1.0"/>
        <cune type="wedge" posX="21" posY="14" angle="90" length="0.5"/>
    </row>
</cunelist>
```

The XML file of cunes found by the cune-finding step can be provided as input data to the translation process and/or to describe symbol libraries in the database. Each symbol description generally has a list of significant features and their positions relative to the center of the symbol. The library can be arranged according to a sorted feature index to promote rapid location of symbols by feature.

The process results in creation of a symbol alternatives graph 806, which can be stored in memory. The symbol alternatives graph 806 can be exported to a work-in-progress symbol-graph or table in an accessible memory or database. Optionally details of a rule history can be exported to a debugging file on the server. An example algorithm runs a feature detector on a current line of the cuneiform input 800 to generate a list of features and their positions. For each feature in the input, for each library, look up the symbols with the given feature and compare any additional features to the adjacent features in the input stream. The symbols can be ranked by feature match. Individual cunes in each symbol can be compared to the cunes in the input stream. The symbols can be re-ranked by a cune match algorithm and the top ranking symbols put into the symbol alternatives graph.

On completion of the symbol search, the graph is processed, ranking parallel alternatives by how well they use up the list of cunes without overlapping into adjacent symbols. Alternatives of the illustrative example show unused cunes 808 in at least some of the alternatives. A most-likely-path is generated through the alternative symbols and used as input to the next step. Upon completion, the top most likely alternatives through the path are returned to the user interface. Note that if the user chooses a different alternative, the rest of the processing may need to be run again to regenerate the next stages in the translation.

An important concept that underlies the translation steps is capturing the ambiguity at each step, e.g., with an acyclic directed graph of alternatives. The alternatives graph for each step can be built by the rules at that step and potentially modified by feedback from rules applied during succeeding steps. Alternative interpretations can be at many levels of granularity, from alternate ways of parsing the cune stream into symbols up to alternative interpretations for the entire inscription.

There is another level of expansion of alternatives because signs can be read or otherwise interpreted differently. In the illustrative examples disclosed herein, the signs can be read as logographic in the original Sumerian with an Akkadian translation, or as phonetic Akkadian syllables that need to be combined to get the Akkadian word, and then appropriately interpreted for noun declension, verb form, etc. The graph 806 shown is for only one translation library. Additional translation libraries for different time periods and different geographical locations generate additional parallel sets of paths. Libraries have attributes that define whether they are a "base" library with a complete set of symbols for a period and location, or whether they are a "variant" library that adds a period or location variant to a specific base library.

Figure 9A:
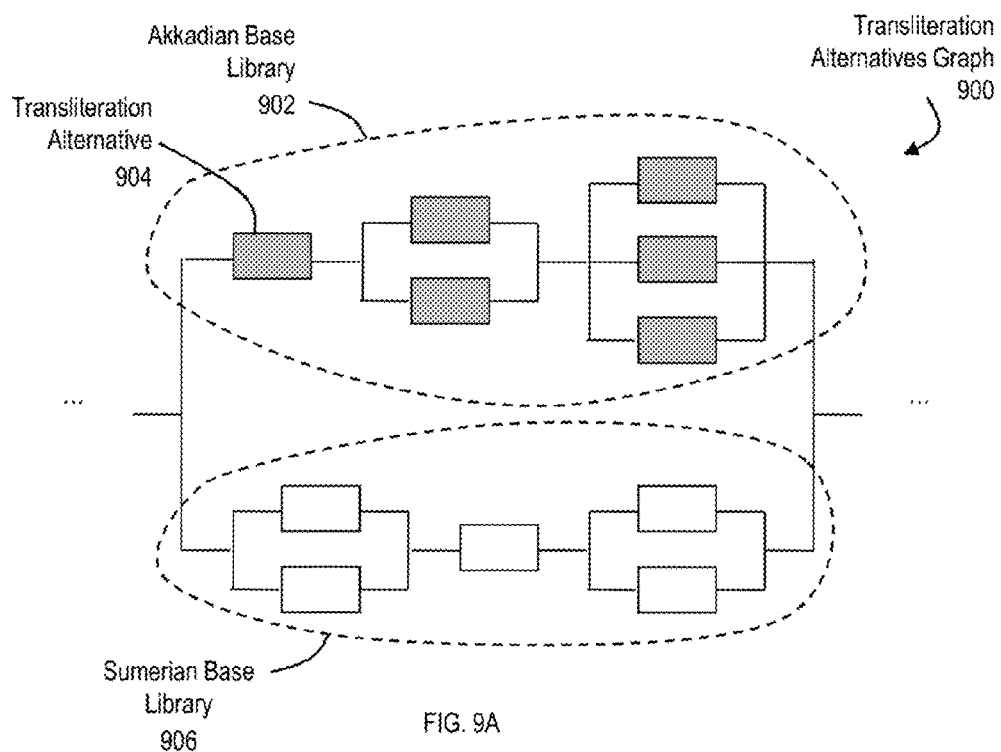
FIGS. 9A and 9B depicts graphical representations of alternative transliteration process of an embodiment of a translation system of FIGS. 1-5.
Figure 9B:
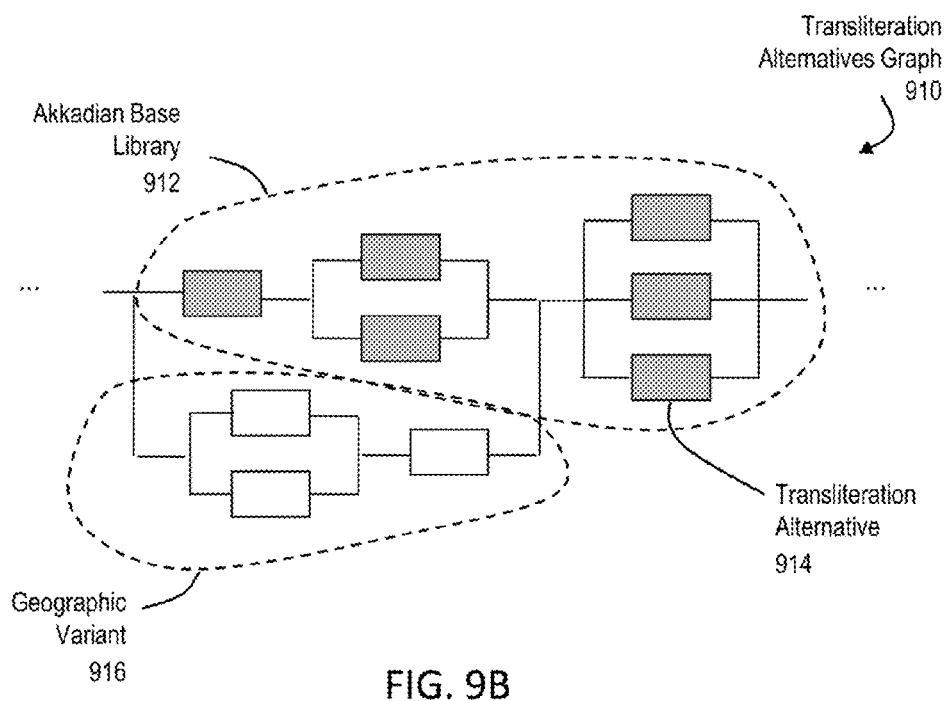

FIGS. 9A and 9B depicts graphical representations of alternative transliteration process of an embodiment of a translation system of FIGS. 1-5. Namely, a transliteration alternatives graph 900 includes a first graph segment 902 determined according to a first library, e.g., an Akkadian base library and a second graph segment 906 determined according to a second library, e.g., a Sumerian base library. The example illustrates how different libraries can generate different alternative paths in a resultant transliteration graph 900. By the nature of the two libraries being associated with completely different time periods, two completely different sets of paths 902, 906 appear in the resulting alternatives graph 900.

Another transliteration alternatives graph 910 includes a first graph segment 912 determined according to the Akkadian base library and a second graph segment 916 determined according to a geographic variant of the Akkadian base library is shown. This example illustrates how a variant library generally can add a major set of parallel paths to the result graph 900.

Advantage can be taken of distributed processing power of a distributed, e.g., cloud-based, solution to conduct parallel searches in different libraries. (It is a performance optimization detail whether different search processes are on different threads on a multi-processor machine or different machines in a distributed server environment.) Running all possible rules against such a complex graph causes a combinatory explosion. The full set of possible rules to apply is the "search space." A very large search space means a very long run time. Some level of brute-force reduction in time can be applied by taking advantage of the parallel processing inherent in a cloud-based solution. However, the big win comes from using a search for "prototypes" to limit the exploration of the search space to areas that are most likely to have reasonable solutions.

A prototype is a common construction. Prototypes typically come from interviewing expert translators and by applying pattern recognition tools to large volumes of existing translations. For instance, a male determinative followed by a cuneiform sign referred to as a "dingir" strongly suggests that the next few symbols will probably be a name. There are many other possible meanings for the first two symbols, but those two found together are a very strong probability, so put a high priority on running related rules.

The first level of prototypes looks for people, places, things, activities, common names, and common sentence constructions. That can quickly apply highly probably interpretations to chunks of the untranslated symbols, leaving many fewer unknowns for general rule application and significantly limiting the search space.

A second level of prototypes then looks for more general patterns, such as whether were dealing with people, places, things, and whether its a description, receipt, or discussion. These rules provide guidance that further limits the application of general rules to the remaining unknowns and provides guidance on which alternatives from the first set of prototypes are most likely to be correct.

There are a large number of prototypes, but many fewer than the total number of rules and combinations of rules, so a bit of brute force parallel processing applied to the prototype rules significantly shortens the processing time and generates probability ratings to the results that rank the results, making it possible to return the most likely results to the user.

A transliteration or transcription stage uses two parallel rule sets: a simple look-up table of Sumerian logograms and a two-step process for Akkadian phonemes. Both output to the same transcription graph. Transcription starts by looking up the phoneme for the cuneiform symbol. Then the system runs unification rules to find words spelled by the phonemes. Akkadian has a complex set of prefix, infix, and suffix forms that make a simple lookup impractical. A library of "prototype" rules can be used to look for typical forms (adjectival endings, typical infix syllables, etc.) and for typical determinatives that indicate what kinds of words follow. The prototype rules search for significant entities in the input, such as names, dates, quantities, sentence-subject and -object indicators. The rules output to an incomplete sentence graph, common-topic graph, and document-structure graph. Rather than exhaustively process the input into an unwieldy set of large graphs, the process jumps forward to a first pass at the syntactic/semantic step which will provide feedback to limit the alternatives.

Figure 10:
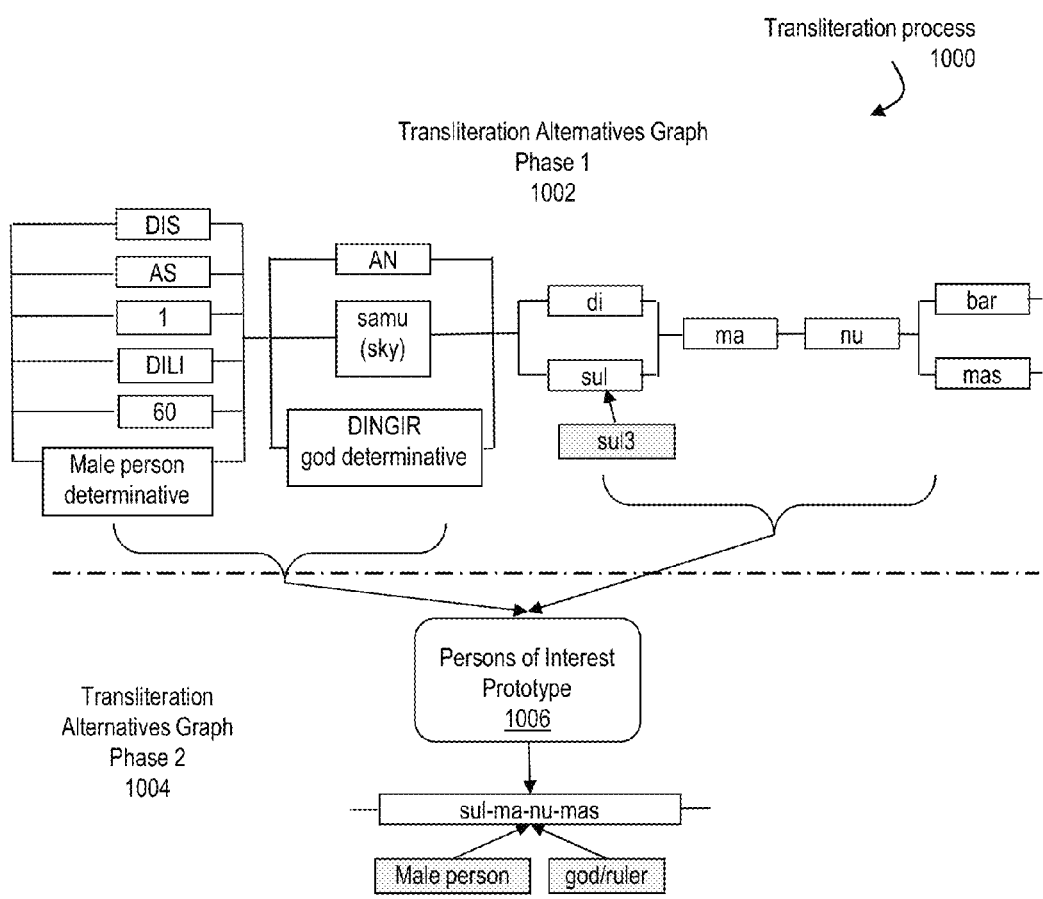
FIG. 10 depicts a more detailed graphical representation of the transliteration process of FIG. 7.

FIG. 10 depicts a more detailed graphical representation of the transliteration process 1000 of FIG. 7. In at least some embodiments, the transliteration process 1000 has two phases with two separate graphs. A first phase 1002 of the process converts symbols into words and phonemes. A second phase 1004 of the processes applies determinatives and phonemes from the first graph to the second graph which is entirely Akkadian words: "sul-ma-nu-mas." The first phase 1002 splits into two separate operations, one for logograms (Sumerian with Akkadian translations) and one for phonetic Akkadian. They have separate rule libraries but output to the same first phase transliteration alternatives graph 1002.

There is often more than one cuneiform symbol that stands for a given Akkadian phoneme. They are indicated by accent marks and numerals. For the purpose of converting the phonemes to the final Akkadian word, they are equivalent. The first phase graph 1002 stores the base phoneme and retains phoneme matching of the actual symbol as an attribute of that node (i.e., sul3 is converted to sul and sul3 stored as its attribute).

The phase 2 graph 1004 keeps the determinatives as attributes of their Akkadian words. The phase 2 rules processing is driven by applying prototype rules to the phase 1 graph. These prototypes look for people, places, things, typical word structure, typical sentence structure, and other patterns that suggest which transliteration rules to apply first.

The diagram of FIG. 10 shows application of a prototype for "persons of interest" 1006. The prototype 1006 detects the male person determinative combined with the deity/ruler determinative and then examines at the following syllables to find that they are the phonetic spelling of a known historical person: Shalmaneser. After more of the text is transliterated, the prototype for "exposition" will detect that this is a repeating of superlatives applied to the same entity—in other words a public relations "puff piece" (as opposed to an itemized list or a general discussion).

The result of such prototypes drive the ranking of low-level processing rules. For instance, to raise the probability of translating GAL as the Sumerian logogram "big" (or important) and looking for an adjacent noun or pronoun before trying to interpret it as an Akkadian phoneme.

With respect to the translation process, the translation from Akkadian to English is based on two separate processes, translation from Akkadian to a neutral grammar and then translation from the neutral grammar to English. The translation from Akkadian uses Unification Grammar rules for Akkadian optimized (ranked) by a statistical tuple-based ranking system. Initially the statistical system is starved for data, so is not very effective. As we build up our stock of translations it will improve steadily.

In the illustrative example, the translation converts the arcane (to us) Akkadian grammar to an internal neutral grammar. The translation leverages the prototype hints already found during transliteration (especially those looking at overall structure—and extends the semantic understanding of the content with additional high level prototypes that can be summarized as "who", "when", "where", "why", "what", and "how."

The neutral grammar is a multi-level structure. The lowest level is the input translated to base sentences in a simple word order with attributes covering emphasis and important details. Such neutral grammars can be a simplified structured English-like language with extensions to deal with constructs not found in English. Note that the word order can be significantly different than it was in the original text, due to different languages having different standard sentence structures (such as the Akkadian sentence having the verb at the end while it's in the middle in the internal representation. The higher level neutral grammar covers main topics, focus of attention, intent, and other semantic interpretations.

The final step of translation is to translate the neutral grammar to another familiar language, such as French, German or English. The final translation can be performed as a fairly straightforward translation; however, more sophisticated techniques can be applied to make the output less stilted.

FIGS. 11A-11D depict a graphical user interface of an embodiment of the client device of FIGS. 1 and 2. In particular, a mobile device 1100, such as a smart phone, includes a display 1102. When running a mobile translation application, the display 1102 portrays graphic elements related to the translation. In FIG. 11A, the display illustrates four selectable tabs along top portion of the display 1102. A leftmost or "Model" tab 1104 is highlighted signifying that the application is performing a modeling process. An unwrapped inscribed image is illustrated in the display 1102, including a bounding rectangle or outlined region in the upper left corner identifying the symbols to be translated. A user can define the bounding region and click within the outlined region causing a dropdown list to be presented. The dropdown list provides a list of alternative symbols that the cunes within the bounded region might segment into.

A second "Symbol" tab 1108 is shown as highlighted in FIG. 11B, signifying that the application is performing a symbol identification process. A symbolic representation of the image is shown in the display 1102 including graphical representations of the symbols. The symbols illustrated can be default chosen symbols, user chosen symbols, e.g., from among proposed alternatives, or a combination of automatically chosen and user chosen symbols. In at least some embodiments, a user can click on a symbol within the display to cause a dropdown a list of alternative symbols to appear, allowing a user to select different symbols. A symbol bounding region presented on the unwrapped image can be moved, dragged, expanded, shrunk or otherwise modified to select different cune segments. Appropriate symbol alternatives are presented in response to the adjustment of the symbol outline. In at least some embodiments, a user is presented with an option to re-run transliteration and/or translation steps in response to selection of one or more different symbols. A user can click elsewhere on the graphical display of the unwrapped image to select a different symbol for analysis.

A third "Transliteration" tab 1110 is shown as highlighted in FIG. 11C, signifying that the application is performing a transliteration process. A number of alternative transliterations of the selected symbols, e.g., those appearing within the bounded region, are illustrated on the display 1102. A user can select, e.g., "click on" a particular symbol or group of symbols to view a list of alternative transliterations for the selected group of symbols. A user can select alternatives from the drop down list. In at least some embodiments, the user can be presented with an option to re-run the translation step in response to selection of one or more alternative transliterations.

A fourth "Translation" tab 1112 a shown as highlighted in FIG. 11D, signifying that the application is performing a translation process. A number of alternative translations of the selected symbols are illustrated on the display 1102. A user can select, e.g., "click on," a particular symbol or group of symbols to view a list of alternative translations for the selected group of symbols. A user can select alternatives from the drop down list.

Segmenting the cune/wedges to symbols, transliterating the symbols, and translating to Akkadian can be implemented by tightly interconnected processes. Selecting text in one step, for example, selects related text in some or even all the steps. The tabs described on each screen of the user interface show all four selections. Translating ancient texts is not an exact science for humans or computers. The techniques disclosed herein can retain the top or most likely results at each step. Selecting a different alternative on one screen causes changes to ripple down the rest of the translation steps.

Figure 12:
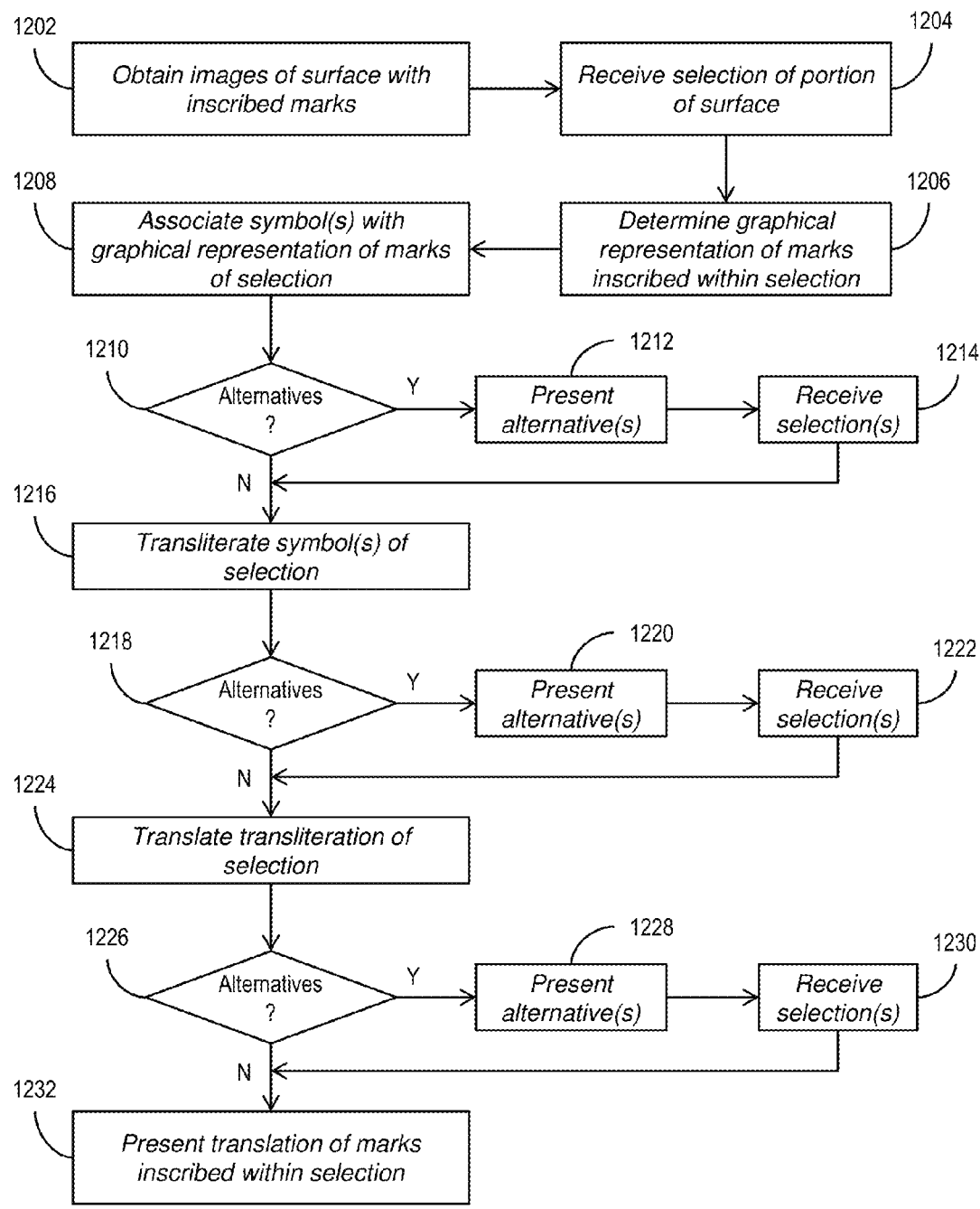
FIG. 12 depicts a flow diagram of an embodiment of a translation process.

FIG. 12 depicts a flow diagram of an embodiment of a translation process 1200. Images of a surface of an object with inscribed markings is obtained at 1202. A selection of a portion of the marks can optionally be obtained at 1204. In some instances the inscription is relatively short such that apportioning among various marks is unnecessary. Graphical representations of the marks are obtained at 1206. This can include graphical representation of all marks on the inscribed surface, or only those marks appearing within the inscribed selection.

Symbols are associated with graphical representations of the marks at 1202. When alternative symbols are determined at 1210, the alternatives can be presented to a user at 1212. The user can make a selection from among the various alternatives, which is received at 1214.

Transcription or transliteration of the selected symbols is determined at 1216. To the extent that alternative transliterations are determined at 1218, the alternatives can be presented to a user at 1220. The user can make a selection from among the various alternatives, which is received at 1222.

Translation of the selected transliteration is determined at 1224. To the extent that alternative transliterations are determined at 1226, the alternatives can be presented to a user at 1228. The user can make a selection from among the various alternatives, which is received at 1230. A final translation of the marks of the inscription is determined at 1232.

It is understood that searches can be performed at one or more steps of the translation process 1200. For example, a dictionary search can be used at one level, e.g., transcription, to find the possible interpretations for the next level, e.g., symbolization.

Results of any level can be rank ordered. For example, possible symbols for selected views, can be ranked by probability. Thus a symbol view at a user display can show possible transliterations. Likewise, a translation view at a user display can show shows possible translations. In a knowledge-based search, a translation database can be configured to provide levels of generality. In associating symbols with markings, the search can produce an exact match, and/or an expanded match. In more detail, an expand symbol can be associated with its logogram (if any) and all translations of that logogram provided. Searches can be expanded, e.g., symbol to phonetic and/or find all. Search can return homophones that sound like that phoneme, e.g., searching for matches on all the homophones. (Example: šar has ten homophones, šar2, ni, sud, muš3, lagab×sum, lu1, sum, a.lagab×ku1, and nu.

Search results can be arranged according to various techniques, such as by frequency of use, by symbol (standard sort order), alphabetically by transliteration, or translation, and possibly by sequence number.

A transliteration expanded match can be expanded to homophones and searched on all matches. Alternatively or in addition, translation searches can be performed on all conjugations and declensions of given words. Further, translation fragments can be generated and used to search for matching translations. Other search techniques include "most likely neighbor" searches. Such searches can be helpful for trying to interpret an adjacent unknown or unreadable section.

In some embodiments, information from any point in the overall translation process 1200. For example, object data, photos, 3D models, transcribed markings, symbols, transliterations and/or translations can be retained or otherwise stored. Such information related to the translation process can be stored locally, e.g., on a client platform or mobile device 108 (FIG. 1), or remotely, e.g., at the app server(s) 102, the database(s) 112, or other supporting servers 114, including social media server(s) 116. The information related to the translation process can be used by the original user, e.g., in repeating one or more portions of a translation according to a variant, to time shift translations allowing, e.g., a cursory analysis in the field, followed by a more thorough analysis at a later date. According the information may be retained for a relatively brief duration, e.g., until the next power cycle, or according to some other schedule. Alternatively, the information may be retained for a relatively long time or even indefinitely, as scholarly works are retained in libraries. To that end, one or more aspects of the translation information can be retained privately, shared publicly. In some embodiments, encryption can be applied to secure information before, during and/or after completion of a translation process.

In some embodiments, a tag or suitable device can be used to access stored information. A device, such as a machine readable code, e.g., a QR code and/or bar code, can be associated with stored translation information. A reader scanning the tag device can access the previously stored information. Consider a museum or library containing ancient archeological artifacts with inscriptions. A visitor to the museum/library has the enjoyment of seeing the object first hand. When associated with a QR code, the visitor can access translation data by simply scanning the QR code. Such immediate and up to date translations can provide an entirely new experience for visitors to learn and relate to other cultures, time periods, etc.

In yet other embodiments, the translation information can be used in conjunction with virtual reality presentations. A student studying an ancient site, such as a tomb or temple, can experience a journey through space and time by entering a virtual reality of the particular location. The virtual reality can provide photographic representations of inscribed objects, 3D models of the inscribed objects, graphical transcoding of imaged inscriptions, and actual translations. A viewer can control presentations in the virtual reality to access one or more different presentations, including accessing translation information.

The following discloses an illustrative example of obtaining an unwrapped image of an inscribed object for processing in accordance with the techniques disclosed herein. For each image of a collection of images 602, a relative position and orientation of a camera in 3D is determined with respect to the object in a world coordinate system. Intrinsic parameters of the optics are estimated as well, so that lens distortion can be compensated for, and precise 3D measurements can be made (camera calibration and pose estimation).

A process of calibrating the cameras and estimating their pose can be accomplished by extraction of "feature points" in the images and establishing correspondences amongst feature points across images. Images that do not contain enough feature points, or containing feature points which cannot be matched, are discarded.

In an illustrative example, 29 images were captured, 7 images were discarded. From the feature point correspondences, the camera pose and intrinsic parameters are estimated for all the remaining images. Each set of corresponding points is associated with a 3D keypoint whose position with respect to the world coordinate system is also obtained by triangulation. In general this is a sparse set of points. Some of these 3D keypoints belong to the object of interest and some to the background, such as a table on which the object is resting. The 3D keypoints are often sparse, and insufficient to determine the object's precise geometry.

A second step is to extend this sparse set of points to a dense set of points, using stereo algorithms from pairs of images, or multi-view stereo algorithms from all the images taken together as a set. A third step is to fit a continuous surface, which can be represented as a colored polygon mesh, to this dense set of points. In some embodiments, a location and orientation of a frontal face of the object is detected, a bounding box is computed, and the surface reconstruction is performed within the bounding box.

A picture provides a 3D rendering of the dense set of points along with the 22 cameras. The picture shows the same view of the surface reconstructed from these points using a suitable algorithm. The point of view can be changed interactively, and various scene elements, such as the points, the bounding box, the cameras, and the surface, can be hidden. In the upper right corner of the tool, one of the input images is displayed. The corresponding camera can be identified in the 3D view by texture mapping the image onto the rendered image plane. The illustrative examples disclosed herein related to cuneiform tablets with a rather planar frontal face. More generally, the techniques can be applied to other more complex configurations and/or other languages and/or writings.

Many existing multi-view surface reconstruction algorithms produce surfaces represented as polygon meshes that can be colored. These meshes are very good for visualization purposes, but either may not contain the geometric details at all, or the geometric resolution is not good enough to robustly segment cuneiform type inscriptions. This is challenging because many of the tablets bearing cuneiform inscriptions are eroded, fractured, or damaged, and in those cases it is difficult even for an expert to identify the "cunes" by visual inspection. Experiments suggest that high pixel count digital cameras are preferable, and specific guidelines should be followed to illuminate the scene and to position the camera, in order to reconstruct the geometry at a level of detail that allows for the robust cune segmentation.

The inscriptions can be segmented by analyzing geometric properties of the polygon mesh. Resultant images show (1) a 3D rendering of the dense set of points reconstructed from multiple photos, where the principal plane and the oriented bounding box containing the inscriptions are computed strictly from the points and the original images; (2) a colored polygon mesh reconstructed from the points, rendered from the same point of view; (3) the mesh seen from an orthographic projection onto a plane parallel to the principal surface; (4) the result of a segmentation algorithm, where the areas of a first color, e.g., yellow, contain the inscription; and (5) the boundaries of the yellow regions represented as closed 2D polygon curves. A differently colored region can be classified as the frontal plane. Other differently colored regions are not properly classified yet. Further steps are needed to decide whether these regions should be reclassified as part of the inscriptions, or part of the frontal plane. Further analysis of the curves' geometry, and/or frequency analysis of the x and y coordinates of the polygon curve vertices, can be used to identify almost all the strokes, and to represent them as symbols along with their positions and orientations on the frontal plane, to enable the translation process. In some embodiments, the process is fully automated. Alternatively or in addition, the process allows for further verification and/or minor corrections by the user. In some embodiments, such user input can be integrated in an iterative fashion with the automated portions of the process.

At least some image-based 3D reconstruction algorithms are based on finding pixel correspondences across the input image set. An automatic object segmentation algorithm has been developed specially for classifying every pixel in each input image either as background or foreground, so that no computational resources are wasted on background pixels. The output provides a binary mask per input image. Later, other algorithms can read the segmentation masks together with the original images and use the foreground/background pixel classification to improve their results.

An assumption can be made in this process, for example, that foreground and background have noticeably different color ranges, although, no special background color. Preferably, a photographer would place the object on a surface of a color sufficiently different from the object, or use some other colored backdrop. The automatic object segmentation algorithm comprises the following steps: (1) scaling down the input images to remove noise and small details; (2) applying a median filter to make colors more similar in similar-looking regions while creating sharp edges between regions; (3) computing the chromaticity channels of the image; (4) running a k-means clustering algorithm that assigns each pixel to one of the regions; (5) determining the two largest connected components, and merging all the other smaller components into those two; and (6) scaling up the resulting image mask to match the original input image size.

Camera calibration is the process of estimating the intrinsic parameters of each camera, such as, focal length, distortion coefficients, and principal point, as well as the camera poses at the image capture time. In some cases the intrinsic camera parameters can be pre-computed in the laboratory. When non-professional cameras (e.g., compact-size cameras, cell phones, and tablets) are used, intrinsic parameters and pose can be estimated directly for all the cameras at once from the input image set, without any additional pre-calibration procedure required, using Structure-from-Motion (SfM) algorithms. This approach may sacrifice some 3D reconstruction fidelity but enables the process to work with a wider range of images, simplifying the data capture step. One publicly available SfM package is "Bundler" (phototour.cs.washington.edu/bundler). In addition to the camera calibration parameters, the software outputs a sparse set of 3D keypoints which can be used in subsequent processing steps. The Bundler can be applied as a temporary solution, because of software design limitations that result in degraded geometric precision. More preferably a camera calibration algorithm is applied, based on a more detailed camera model and better feature detector, which increases the calibration accuracy, and yields results comparable to those obtained with pre-calibrated cameras.

As explained above, using the 3D keypoints the 3D bounding box can be determined enclosing the object surface containing the characters of interest, and orient it in such a way that the top plane is parallel to the object top surface and that sides are parallel to the writing direction. Preferably the techniques apply to objects with mostly planar as well as a more general case, in which the bounding region is chosen as a function of a shape of the object (e.g., brick, cone, cylinder).

The input data of the illustrative example are a sparse set of 3D keypoints, the original images, and the image masks. The output is a rectangular bounding box with a rotation and translation that converts the input point coordinate system to a new coordinate system defined on the bounding box. The algorithm comprises the following steps: (1) projecting each point onto each of the input images and discarding those which project onto a foreground pixel; (2) identifying the top plane using a robust Principal Component Analysis (PCA) algorithm; (3) projecting the foreground regions from each image onto the top plane and computing their intersection; (4) determining the tightest 2D bounding box for this region by computing bounding boxes in various orientations, and selecting the tightest; and (5) extruding this 2D bounding box in the vertical direction to obtain a 3D bounding box for the region of the frontal plane containing the inscriptions.

For small inscribed objects, where all the characters can be seen within a single image, two high-resolution photos are enough to reconstruct its written surface with high accuracy. A stereo reconstruction algorithm optimized for this application can be applied. The reconstruction of larger objects, or objects with tiny characters, can be done by applying the stereo algorithm independently to different object regions and then merging the results to make a complete model, or using a multi-view stereo algorithm (MVS) on all the images at once. Several algorithms have been proposed to solve this problem, such as PMVS (grail.c-s.washington.edu/software/pmvs) which works well when used with high-resolution photographs, e.g., 8-16 megapixels. However, PMVS is a complex and rather slow algorithm that works well for more complex scenes. Faster MVS algorithms are envisioned that are optimized for the techniques disclosed herein.

Well established multi-resolution techniques in the design and implementation of our stereo algorithm are applied. It produces a very dense point cloud, but it has noticeable staircase artifacts as a result of matching each pixel using integer disparities. To fix this problem a new optimization-based disparity refinement step is applied, which minimizes an energy function. The target energy is continuous allowing the disparities to have real values, removing the limitation of integer pixel matches. The final result after triangulation is a 3D model that varies smoothly without the staircase artifacts present in models with no disparities refinement.

A variational formulation can be used for reconstructing watertight surfaces defined by implicit equations from finite sets of oriented points. An open-source implementation of a Smooth Signed Distance (SSD) Surface Reconstruction formulation is available at mesh.brown.edu/ssd. It has been shown that this approach competes very well with other popular methods. The method is able to reconstruct the geometry of cuneiform tablets if the dense point clouds generated by the stereo or multi-view stereo algorithms contain the necessary detail. However, since the process was designed to address the general case of arbitrary topology, it produces polygon meshes where it is difficult to identify and segment out the inscriptions. In some embodiments, the polygon mesh is a quadrilateral mesh defined as a height map over a regular 2D grid, so that the heights can be stored as a 2D matrix of floating point numbers, amenable to image-processing-oriented algorithms and software.

According to a surface segmentation process, a small region of a test object containing a single cuneiform character is identified. A rendering of a quadrilateral mesh reconstructed from the dense set of points for this region is obtained. The same mesh is rendered with vertex colors computed as average of image projections. A segmentation algorithm is applied in a first step, e.g., based on estimating the maximum directional curvatures for every vertex of the polygon mesh. The surface normal vectors are next rendered on top of the colored mesh using an orthographic projection onto a plane parallel to the principal frontal plane. Once a threshold is chosen to define a flat surface (i.e., with curvature zero), each vertex can be assigned one of six labels, depending on whether the curvatures are positive or negative and above or below the threshold. A first colored region in a processed image corresponds to vertices with negative minimum curvature and the maximum curvature below the threshold. A second colored, e.g., green region corresponds to vertices with minimum curvature below the threshold and positive maximum curvature, and a third colored, e.g., gray areas are the flat vertices, where both curvatures are below the threshold. Since this classification can be noisy, additional techniques can be used, such as the maximum deviation of the surface normal from the vertical direction in a neighborhood of a vertex as an additional measure of flatness.

One version of a segmentation algorithm works well more or less independently of the mesh resolution (how many polygons cover the symbols). The resolution of the mesh can be chosen independently of the 3D point cloud density and/or image resolution. If the mesh resolution is too low, then the geometry of the characters is not properly reconstructed. But the algorithm performs consistently well on higher resolutions and on different datasets. The transcription engine expects a symbolic representation of the inscriptions, with every stroke (cune=Y) described in 2D by a position and orientation. Analysis of damaged parts of a surface of an object can include different analyses and additional algorithms, for example, using the position and orientation of neighboring characters, and their likelihood of showing up together, as it is routinely done in optical character recognition (OCR).

In some embodiments, one or more of the system components includes a web portal. The web portal can be used for managing services of one or more system components of FIGS. 1-5 and communication systems 400-500. A web page of the web portal can be accessed by a Uniform Resource Locator (URL) with an Internet browser using an Internet-capable communication device such as those described in FIGS. 1-5. The web portal can be configured, for example, to access one or more of an application server 102, supporting server(s) 114, database(s) 112, social media server(s) 116, the network 106, the mobile network 110, and services managed thereby such as image capture, image processing and/or translation. The web portal can also be used for provisioning translation services described earlier, provisioning storage, processing, Internet services, provisioning cellular phone services, and so on.

The web portal can further be utilized to manage and provision any of the software applications disclosed herein or equivalents to adapt these applications as may be desired by subscribers and/or service providers of systems of FIGS. 1-5. For instance, users of the services provided by server 102 or server 502 can log into their on-line accounts and provision the servers 102 or server 502 with one or more of user profiles, preferences, prior translations, and so on. Service providers can log onto an administrator account to provision, monitor and/or maintain one or more aspects of the systems of FIGS. 1-5.

Figure 13:
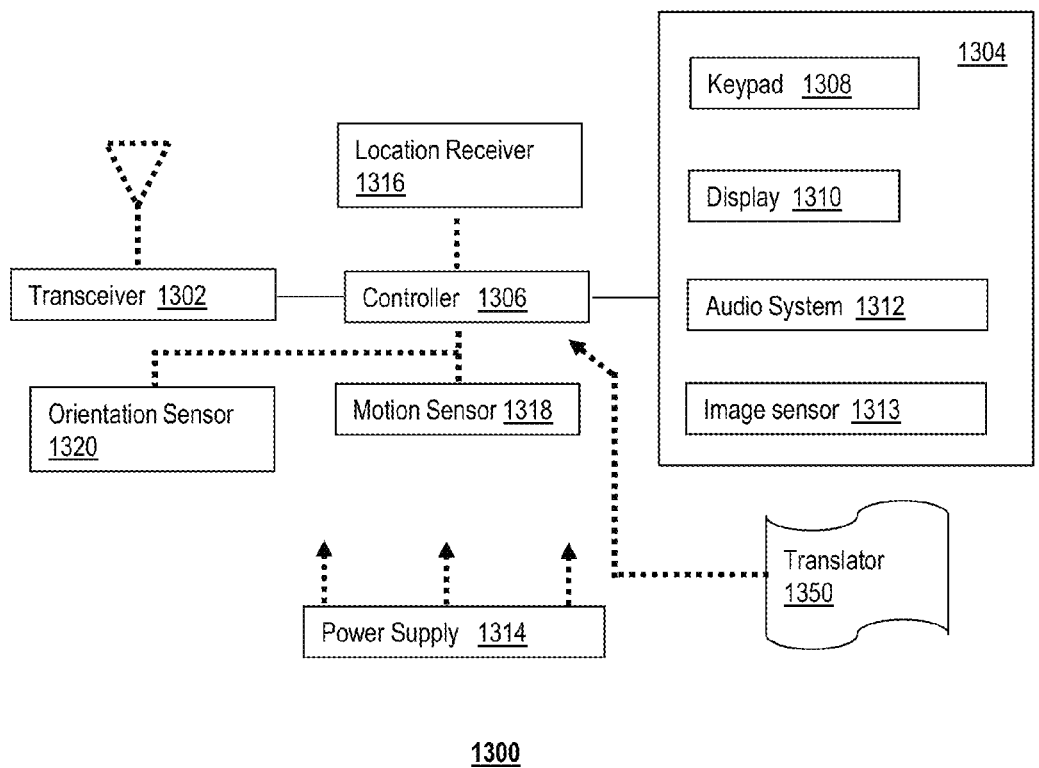
FIG. 13 depicts an illustrative embodiment of a communication device.

FIG. 13 depicts an illustrative embodiment of a communication device 1300. The communication device 1300 can serve in whole or in part as an illustrative embodiment of the devices depicted in FIGS. 1, 2, 4 and 11. The communication device 1300 in whole or in part can represent any of the communication devices 108, 200, 400, 1100 described in FIGS. 1-5 and can be configured to perform at least portions of method 1200 of FIG. 12.

Communication device 1300 can comprise a wireline and/or wireless transceiver 1302 (herein transceiver 1302), a user interface (UI) 1304, a power supply 1314, a location receiver 1316, a motion sensor 1318, an orientation sensor 1320, and a controller 1306 for managing operations thereof. The transceiver 1302 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1302 can also be adapted to support circuit-switched wireline access technologies (such as PSTN), packet-switched wireline access technologies (such as TCP/IP, VoIP, etc.), and combinations thereof.

The UI 1304 can include a depressible or touch-sensitive keypad 1308 with a navigation mechanism such as a roller ball, a joystick, a mouse, or a navigation disk for manipulating operations of the communication device 1300. The keypad 1308 can be an integral part of a housing assembly of the communication device 1300 or an independent device operably coupled thereto by a tethered wireline interface (such as a USB cable) or a wireless interface supporting for example Bluetooth®. The keypad 1308 can represent a numeric keypad commonly used by phones, and/or a QWERTY keypad with alphanumeric keys. The UI 1304 can further include a display 1310 such as monochrome or color LCD (Liquid Crystal Display), OLED (Organic Light Emitting Diode) or other suitable display technology for conveying images to an end user of the communication device 1300. In an embodiment where the display 1310 is touch-sensitive, a portion or all of the keypad 1308 can be presented by way of the display 1310 with navigation features.

The display 1310 can use touch screen technology to also serve as a user interface for detecting user input. As a touch screen display, the communication device 1300 can be adapted to present a user interface with graphical user interface (GUI) elements that can be selected by a user with a touch of a finger. The touch screen display 1310 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1310 can be an integral part of the housing assembly of the communication device 1300 or an independent device communicatively coupled thereto by a tethered wireline interface (such as a cable) or a wireless interface.

The UI 1304 can also include an audio system 1312 that utilizes audio technology for conveying low volume audio (such as audio heard in proximity of a human ear) and high volume audio (such as speakerphone for hands free operation). The audio system 1312 can further include a microphone for receiving audible signals of an end user. The audio system 1312 can also be used for voice recognition applications. The UI 1304 can further include an image sensor 1313 such as a charged coupled device (CCD) camera for capturing still or moving images.

The power supply 1314 can utilize common power management technologies such as replaceable and rechargeable batteries, supply regulation technologies, and/or charging system technologies for supplying energy to the components of the communication device 1300 to facilitate long-range or short-range portable applications. Alternatively, or in combination, the charging system can utilize external power sources such as DC power supplied over a physical interface such as a USB port or other suitable tethering technologies.

The location receiver 1316 can utilize location technology such as a global positioning system (GPS) receiver capable of assisted GPS for identifying a location of the communication device 1300 based on signals generated by a constellation of GPS satellites, which can be used for facilitating location services such as navigation. The motion sensor 1318 can utilize motion sensing technology such as an accelerometer, a gyroscope, or other suitable motion sensing technology to detect motion of the communication device 1300 in three-dimensional space. The orientation sensor 1320 can utilize orientation sensing technology such as a magnetometer to detect the orientation of the communication device 1300 (north, south, west, and east, as well as combined orientations in degrees, minutes, or other suitable orientation metrics).

The communication device 1300 can use the transceiver 1302 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1306 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1300.

Other components not shown in FIG. 13 can be used in one or more embodiments of the subject disclosure. For instance, the communication device 1300 can include a reset button (not shown). The reset button can be used to reset the controller 1306 of the communication device 1300. In yet another embodiment, the communication device 1300 can also include a factory default setting button positioned, for example, below a small hole in a housing assembly of the communication device 1300 to force the communication device 1300 to re-establish factory settings. In this embodiment, a user can use a protruding object such as a pen or paper clip tip to reach into the hole and depress the default setting button. The communication device 1300 can also include a slot for adding or removing an identity module such as a Subscriber Identity Module (SIM) card. SIM cards can be used for identifying subscriber services, executing programs, storing subscriber data, and so forth.

The communication device 1300 as described herein can operate with more or less of the circuit components shown in FIG. 13. These variant embodiments can be used in one or more embodiments of the subject disclosure.

The communication device 1300 can be adapted to perform the functions of the mobile device 108 or the portable communication devices 1100 of FIG. 11. It will be appreciated that the communication device 1300 can also represent other devices that can operate in systems of FIGS. 1-5, such as the client 104, 200 and client modules 400, the application server(s) 102, 300, 502, the supporting server(s) 114, 522, the database(s) 112, 518 and the social media server(s) 116.

The communication device 1300 shown in FIG. 13 or portions thereof can serve as a representation of one or more of the devices of systems of FIGS. 1-5. In addition, the controller 1306 can be adapted in various embodiments to perform one or more of the functions related to image capture, image processing, symbolizing, transliteration, translation and user interface.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 14:
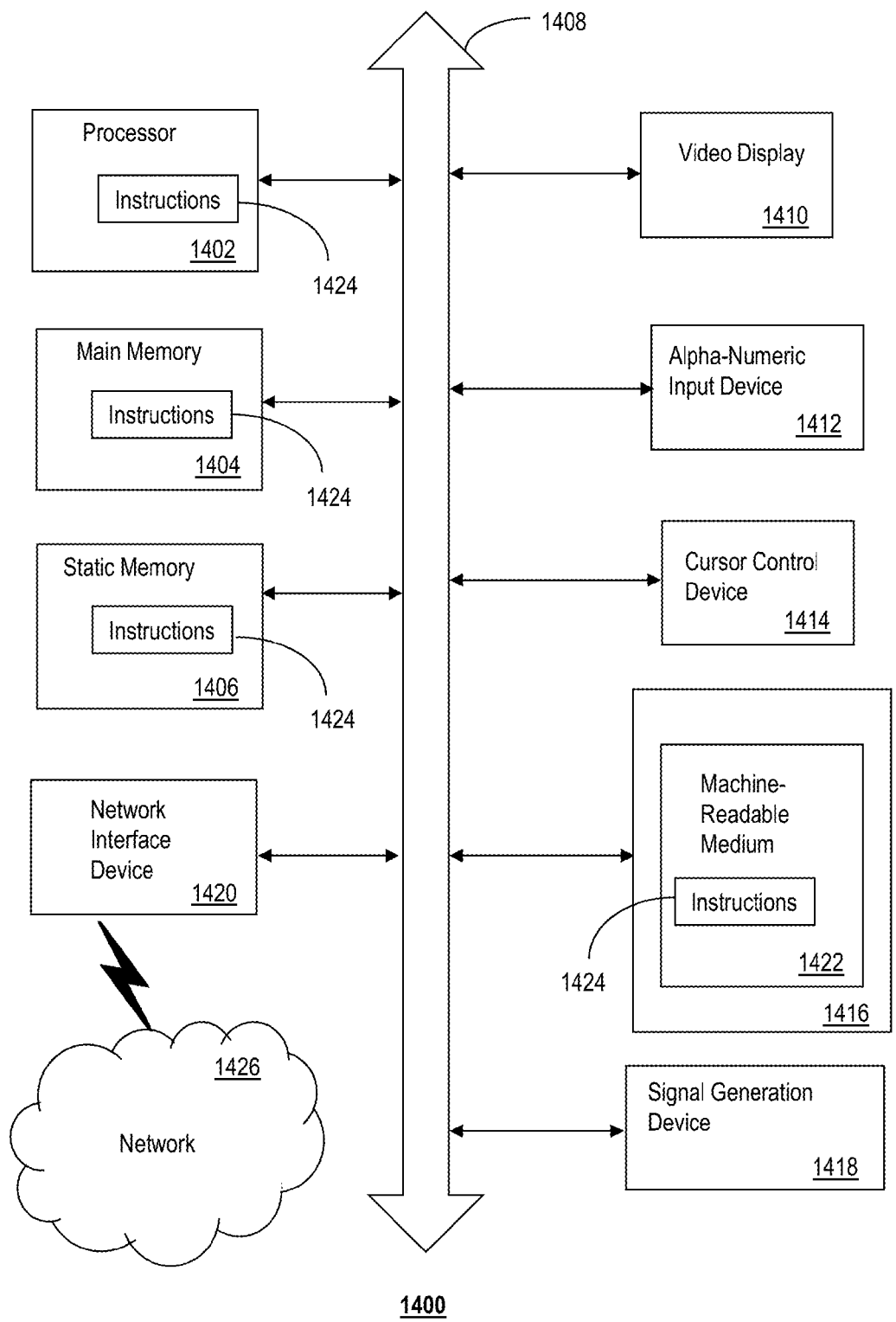
FIG. 14 is a diagrammatic representation of a machine in the form of a computer system within which a set of instructions, when executed, may cause the machine to perform any one or more of the methods described herein.

FIG. 14 depicts an exemplary diagrammatic representation of a machine in the form of a computer system 1400 within which a set of instructions, when executed, may cause the machine to perform any one or more of the methods described above. One or more instances of the machine can operate, for example, as the mobile device 108, the client 104, 200 and client modules 400, the application server(s) 102, 300, 502, the supporting server(s) 114, 522, the database(s) 112, 518 and the social media server(s) 116 and other devices of FIGS. 1-5 and 11. In some embodiments, the machine may be connected (e.g., using one or more networks 106, 110, 1426) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1400 may include a processor (or controller) 1402 (e.g., a central processing unit (CPU)), a graphics processing unit (GPU, or both), a main memory 1404 and a static memory 1406, which communicate with each other via a bus 1408. The computer system 1400 may further include a display unit 1410 (e.g., a liquid crystal display (LCD), a flat panel, or a solid state display). The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420. In distributed environments, the embodiments described in the subject disclosure can be adapted to utilize multiple display units 1410 controlled by two or more computer systems 1400. In this configuration, presentations described by the subject disclosure may in part be shown in a first of the display units 1410, while the remaining portion is presented in a second of the display units 1410.

The disk drive unit 1416 may include a tangible computer-readable storage medium 1422 on which is stored one or more sets of instructions (e.g., software 1424) embodying any one or more of the methods or functions described herein, including those methods illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. For example, particular embodiments are directed to identifying, interpreting and translating cunes of any of the cuneiform based languages. It is understood that the techniques disclosed herein apply broadly to all written languages, be they ancient or modern to interpret logographic and alphabetic inscriptions. Examples include without limitation, hieroglyphics, cuneiform, ancient alphabetic languages such as Greek, Latin, Asian languages, such as Chinese, Sanskrit, etc. Such writings can be broken down into symbols, e.g., letters, syllabus, phonemes, pictograms, and the like. Each of the symbols, in turn, can be further broken down into its constituent elements, referred to herein generally as markings. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving, by a system comprising a processing system including a processor, a plurality of photographic images of an object obtained from different positions relative to the object;
processing, by the system, the plurality of photographic images to determine a three-dimensional model of the object;
generating, by the system, a polygon mesh representation of a three-dimensional surface of the object;
determining, by the system, from the polygon mesh representation of the three-dimensional surface of the object, a graphical representation of a surface of the object comprising a plurality of inscriptions indicative of encoded information;
presenting, by the system, the graphical representation of the surface of the object on a display device;
receiving, by the system, a selection of a region of the graphical representation of the surface of the object, wherein the region bounds a subset of inscriptions of the plurality of inscriptions;
transcribing, by the system, the subset of inscriptions of the graphical representation of the surface of the object to determine a plurality of markings;
associating, by the system, a group of symbols with the plurality of markings;
determining, by the system, for at least one marking of the plurality of markings, a plurality of alternative groups of symbols;
determining, by the system, a plurality of alternative transliterations of a symbol of one of the group of symbols, the plurality of alternative groups of symbols or both; and
determining, by the system, a plurality of alternative translations of a transliteration of the plurality of alternative transliterations,
wherein the graphical representation comprises a flattened surface representation of the three-dimensional surface of the object, and
wherein the method further comprises applying, by the system, frequency analysis to the polygon mesh representation of the three-dimensional surface of the object, wherein the transcribing of the subset of inscriptions is based on the applying of the frequency analysis.

2. The method of claim 1, wherein the determining of the plurality of alternative groups of symbols further comprises:
identifying within the flattened surface representation a plurality of surface segments; and
associating a respective symbol estimate with each surface segment of the plurality of surface segments.

3. The method of claim 2, wherein the determining of the plurality of alternative groups of symbols further comprising:
matching, by the system, at least one marking of the plurality of markings to symbols of a symbol dictionary.

4. The method of claim 1, further comprising:
generating, by the system, at least one of a transcription graph responsive to the determining of the plurality of alternative transliterations and a translation graph responsive to the determining of the plurality of alternative translations;
providing, by the system, one of the transcription graph, the translation graph, or both to equipment of a user for presentation upon a display device; and
receiving, by the system, a selection obtained from equipment of the user, wherein the selection is based on one of the transcription graph, the translation graph, or both.

5. The method of claim 1, wherein the plurality of markings are cunes corresponding to a cuneiform inscription.

6. The method of claim 1, further comprising:
storing, by the system, a translation of the plurality of alternative translations in a searchable data repository.

7. A mobile device, comprising:

a processing system including a processor; and a memory that stores executable instructions that, when executed by the processing system, facilitate performance of operations, comprising:

receiving a plurality of photographic images of an object obtained from different positions relative to the object;

processing the plurality of photographic images to determine a three-dimensional model of the object;

generating a polygon mesh representation of a three-dimensional surface of the object;

determining, from the polygon mesh representation of the three-dimensional surface of the object, a graphical representation of a surface of the object comprising a plurality of inscriptions indicative of encoded information;

presenting the graphical representation of the surface of the object on a display device;

receiving, a selection of a region of the graphical representation of the surface of the object, wherein the region bounds a subset of inscriptions of the plurality of inscriptions;

transcribing the subset of inscriptions of the graphical representation of the surface of the object to determine a plurality of markings;

associating a group of symbols with the plurality of markings;

determining for at least one marking of the plurality of markings a plurality of alternative groups of symbols;

determining a plurality of alternative transliterations of a symbol of one of the group of symbols, the plurality of alternative groups of symbols, or both; and determining a plurality of alternative translations of a transliteration of the plurality of alternative transliterations, wherein the graphical representation comprises a flattened surface representation of the three-dimensional surface of the object, and wherein the operations further comprise applying frequency analysis to the polygon mesh representation of the three-dimensional surface of the object, wherein the transcribing of the subset of inscriptions is based on the applying of the frequency analysis.

8. The mobile device of claim 7, wherein the transcribing of the subset of inscriptions comprises receiving an indication of an enclosed surface about the subset of inscriptions presented on the display device.

9. The mobile device of claim 8, further comprising receiving an input from a user interface of the mobile device to selectively display one of the graphical representation of the surface of the object, at least one marking of the plurality of markings, a symbol of the plurality of alternative groups of symbols, a transliteration of the plurality of alternative transliterations, a translation of the plurality of alternative translations, or combinations thereof.

10. The mobile device of claim 9, wherein one of the plurality of alternative groups of symbols, the plurality of alternative transliterations or the plurality of alternative translations are presented on the display device.

11. The mobile device of claim 9, wherein the one of the plurality of alternative groups of symbols, the plurality of alternative transliterations or the plurality of alternative translations are presented on the display device according to a ranked order.

12. The mobile device of claim 11, wherein the operations further comprise receiving a selection of one of a symbol of the plurality of alternative groups of symbols, a transliteration of the plurality of alternative transliterations, or a translation of the plurality of alternative translations.

13. The mobile device of claim 12, further comprising storing a translation of the plurality of alternative translations in a searchable data repository.

14. A machine-readable storage device, comprising executable instructions that, when executed by a processing system including a processor, facilitate performance of operations comprising:

receiving a plurality of photographic images of an object obtained from different positions relative to the object;

processing the plurality of photographic images to determine a three-dimensional model of the object;

generating a polygon mesh representation of a three-dimensional surface of the object;

determining, from the polygon mesh representation of the three-dimensional surface of the object, a graphical representation of a surface of the object comprising a plurality of inscriptions indicative of encoded information;

presenting the graphical representation of a surface of the object on a display device;

receiving, a selection of a region of the graphical representation of the surface of the object, wherein the region bounds a subset of inscriptions of the plurality of inscriptions;

transcribing the subset of inscriptions of the graphical representation of the surface of the object to determine a plurality of markings;

associating a group of symbols with the plurality of markings;

determining from at least one marking of the plurality of markings a plurality of alternative groups of symbols;

determining a plurality of alternative transliterations of a symbol of one of the group of symbols, the plurality of alternative groups of symbols, or both; and determining a plurality of alternative translations of a transliteration of the plurality of alternative transliterations, wherein the graphical representation comprises a flattened surface representation of the three-dimensional surface of the object, and wherein the operations further comprise applying frequency analysis to the polygon mesh representation of the three-dimensional surface of the object, wherein the transcribing of the subset of inscriptions is based on the applying of the frequency analysis.

15. The machine-readable storage device of claim 14, wherein receiving of the selection of the region of the graphical representation of the surface of the object comprises receiving an indication of an enclosed surface about the subset of inscriptions of the plurality of inscriptions presented on the display device.

16. The machine-readable storage device of claim 15, further comprising receiving an input from a user interface of a mobile device to selectively display one of the graphical representation of the surface of the object, a symbol of the plurality of alternative groups of symbols, a transliteration of the plurality of alternative transliterations, a translation of the plurality of alternative translations, or combinations thereof.

17. The machine-readable storage device of claim 14, wherein the one of the plurality of alternative groups of symbols, the plurality of alternative transliterations, or the plurality of alternative translations are presented on the display device according to a ranked order.

18. The machine-readable storage device of claim 14, wherein the operations further comprise receiving a selection one of a symbol of the plurality of alternative groups of symbols, the transliteration of the plurality of alternative transliterations, or a translation of the plurality of alternative translations.

19. The machine-readable storage device of claim 18, further comprising storing a translation of the plurality of alternative translations in a searchable data repository.

* * * * *